US012309291B2

(12) United States Patent
Wright et al.

(10) Patent No.: US 12,309,291 B2
(45) Date of Patent: May 20, 2025

(54) COMPUTER-IMPLEMENTED SYSTEM AND METHOD FOR DETERMINING OR VERIFYING LOCATION

(71) Applicant: nChain Licensing AG, Zug (CH)

(72) Inventors: Craig Steven Wright, Cardiff (GB); Daniel Joseph, Cardiff (GB)

(73) Assignee: nChain Licensing AG, Zug (CH)

( * ) Notice: Subject to any disclaimer, the term of this patent is extended or adjusted under 35 U.S.C. 154(b) by 444 days.

(21) Appl. No.: 17/427,374

(22) PCT Filed: Jan. 20, 2020

(86) PCT No.: PCT/IB2020/050405
§ 371 (c)(1),
(2) Date: Jul. 30, 2021

(87) PCT Pub. No.: WO2020/157596
PCT Pub. Date: Jun. 8, 2020

(65) Prior Publication Data
US 2022/0029827 A1    Jan. 27, 2022

(30) Foreign Application Priority Data
Feb. 1, 2019   (GB) ..................................... 1901391

(51) Int. Cl.
*H04L 9/32*      (2006.01)
*H04L 9/00*      (2022.01)
(Continued)

(52) U.S. Cl.
CPC .......... *H04L 9/3255* (2013.01); *H04L 9/0825* (2013.01); *H04L 9/0894* (2013.01);
(Continued)

(58) Field of Classification Search
CPC ... H04L 9/3255; H04L 9/0825; H04L 9/0894; H04L 9/3236; H04L 9/50; H04L 9/3239;
(Continued)

(56) References Cited

U.S. PATENT DOCUMENTS 11,329,807 B2 *   5/2022   Fletcher ................ H04L 9/3297
2007/0078817 A1   4/2007   Girao et al.
(Continued)

FOREIGN PATENT DOCUMENTS

CN    106897901 A    6/2017
JP    H09205422 A    8/1997
(Continued)

OTHER PUBLICATIONS

"Sébastien Gambs, Marc-Olivier Killijian, Matthieu Roy, Moussa Traoré, PROPS : A PRivacy-preserving location Proof System , 2014, IEEE 33rd International Symposium on Reliable Distributed Systems, Oct. 2014" (Year: 2014).*
(Continued)

*Primary Examiner* — Mohammed Waliullah
(74) *Attorney, Agent, or Firm* — Messner Reeves LLP

(57) ABSTRACT

A computer implemented method is provided, which comprises the steps of: broadcasting a request for location data; receiving from a plurality of nodes location data comprising a distance and a public key corresponding to an area proximal to that node; selecting a public key which is common to a set of the plurality of nodes; and requesting the set of nodes to participate in threshold secret sharing to obtain a cryptographic signature associated with the common public key. The method makes use of a blockchain for communicating and verifying data, and includes transferring control of a transaction using the cryptographic signature obtained.

17 Claims, 15 Drawing Sheets

(51) Int. Cl.
*H04L 9/08* (2006.01)
*H04W 12/63* (2021.01)
(52) U.S. Cl.
CPC ............ *H04L 9/3236* (2013.01); *H04W 12/63* (2021.01); *H04L 9/50* (2022.05)
(58) Field of Classification Search
CPC ..... H04L 63/107; H04L 9/085; H04L 9/0872; H04W 12/63; G06F 2221/2111
See application file for complete search history.

(56) References Cited

U.S. PATENT DOCUMENTS

| | | | |
|---|---|---|---|
| 2008/0181413 A1 | 7/2008 | Yi et al. | |
| 2010/0215172 A1* | 8/2010 | Schneider | H04L 9/085 713/171 |
| 2010/0248632 A1 | 9/2010 | Bhushan | |
| 2017/0171138 A1* | 6/2017 | Lin | G06Q 30/02 |
| 2017/0366342 A1* | 12/2017 | Gehrmann | H04L 63/0435 |
| 2020/0162243 A1* | 5/2020 | Fletcher | H04L 9/30 |
| 2022/0337399 A1* | 10/2022 | Fletcher | H04L 9/50 |

FOREIGN PATENT DOCUMENTS

| | | | |
|---|---|---|---|
| JP | 7101031 B2 * | 7/2022 | ........... H04L 9/0866 |
| WO | 2019003071 | 1/2019 | |

OTHER PUBLICATIONS

Michele Amoretti, Giacomo Brambilla, Francesco Medioli, Francesco Zanichelli, Blockchain-based Proof of Location, ArXIV eprint; Jul. 2016. (Year: 2016).*

Search Report Application No. GB1901391.1, Jun. 3, 2019.

* cited by examiner

COMPUTER-IMPLEMENTED SYSTEM AND METHOD FOR DETERMINING OR VERIFYING LOCATION

CROSS REFERENCE TO RELATED APPLICATIONS

This application is the U.S. National Stage of International Application No. PCT/IB2020/050405 filed Jan. 20, 2020, which claims the benefit of United Kingdom Patent Application No. 1901391.1, filed Feb. 1, 2019 the contents of which are incorporated herein by reference in their entireties.

FIELD OF THE INVENTION

This disclosure relates generally to methods for determining or verifying (authenticating) a location of a user, device, object or entity, and more particularly to the use of threshold secret sharing to determine/authenticate the location.

DETAILED DESCRIPTION

Figure 1:
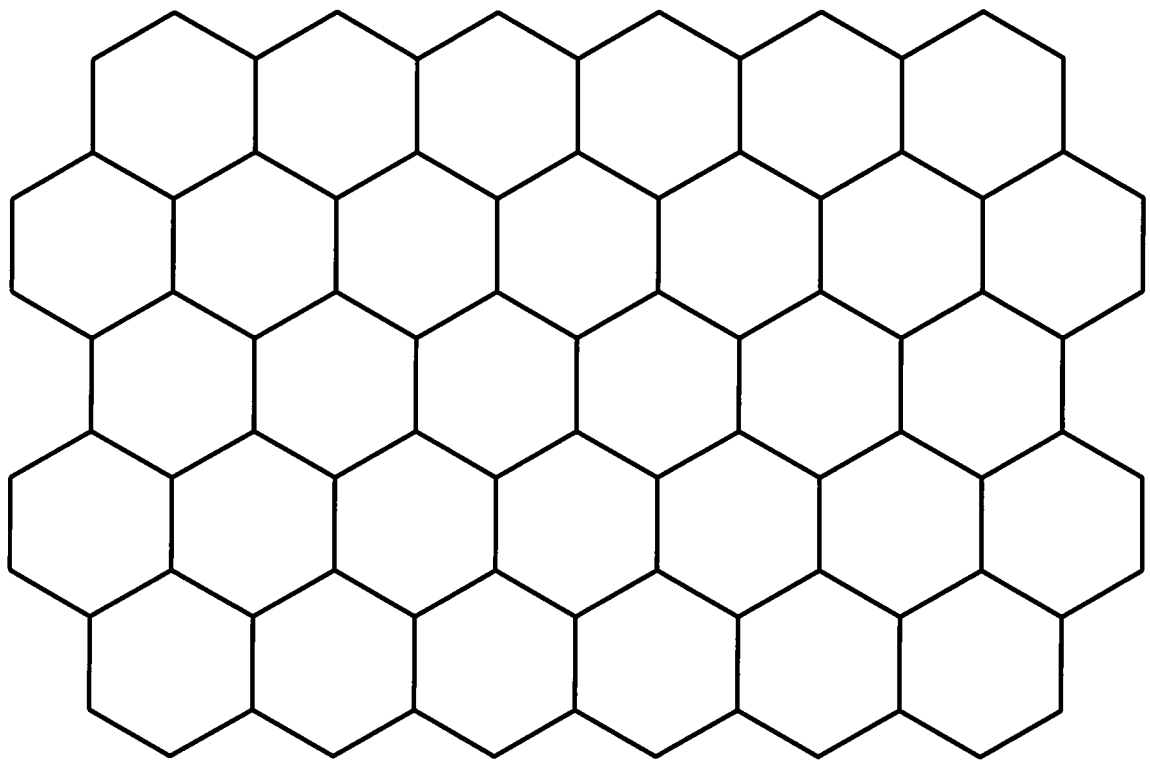
FIG. 1 shows a tessellation of a 2D plane into discrete, hexagonal geographical units.

This disclosure relates generally to methods for determining or verifying (authenticating) a location of a user, device, object or entity, and more particularly to the use of threshold secret sharing to determine/authenticate the location. The disclosure is particularly suited, but not limited to, use with a blockchain, such as the Bitcoin blockchain.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource. The term "Bitcoin" is intended to include any protocol which is a variation of, or derives from, the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

Global Positioning System (GPS) is a satellite-based navigation system that provides geolocation and time information to receivers on Earth. It is owned by the US government and operated by the US Air Force. Comprising at least 24 satellites, GPS is a US Department of Defence initiative but the satellites were made available for civilian use in the 1980s. "GPS satellites circle the Earth twice a day in a precise orbit. Each satellite transmits a unique signal and orbital parameters that allow GPS devices to decode and compute the precise location of the satellite. GPS receivers use this information and trilateration to calculate a user's exact location. Essentially, the GPS receiver measures the distance to each satellite by the amount of time it takes to receive a transmitted signal. With distance measurements from a few more satellites, the receiver can determine a user's position and display it electronically" (www8.garmin.com/aboutGPS/).

Despite its utility and successful integration into modern day products and lives, GPS does have some limitations. Apart from issues and interruptions that arise due to weather conditions and signals being blocked by skyscrapers and other structures, GPS (the civilian version at least) has no proof-of-origin or authentication features. This results in a system susceptible to fraud, spoofing, jamming, and cyber attack.

Despite GPS's successes it provides no authentication of its location data, meaning that for a service that requires a user's location, a user could 'input' location data without the data actually being obtained from the GPS system of satellites. Essentially this means that a user can easily claim to be at a location, providing the GPS coordinates, despite the user not being at the proposed location.

FOAM is a Proof of Location protocol that seeks to offer an alternative to centralised consumer mapping technology and services such as GPS, and of service providers such as Google and HERE. The authors describe FOAM as a protocol that "empowers a permissionless and autonomous network of radio beacons that can offer secure location services independent of external centralized sources such as GPS through time synchronization" (foam.space/).FOAM's Proof of Location utilises Zone Anchors which are land-based 'nodes' utilising radio technologies for the purposes of performing time synchronisation and to ultimately determine a user's location through trilateration. However, while described as a solution to address some limitations of GPS such as spoofing, there is no evident way in the described protocol for verifying that the location provided by a user was legitimately sourced from FOAM's Zone Anchors.

Thus, it is desirable to provide a method of authenticating a location. Such an improved solution has now been devised. Thus, in accordance with the present disclosure there is provided a method as defined in the appended claims.

In accordance with the disclosure there may be provided a computer implemented method. It may be described as a method for determining and/or authenticating a location. The method may comprise the steps of:
 broadcasting a request for location data;
 receiving, from each of a plurality of nodes, respective location data comprising at least one public key corresponding to a respective at least one area adjacent that node;
 selecting a common public key which is common to a set of the plurality of nodes; and
 requesting the set of nodes to participate in threshold secret sharing to obtain a cryptographic signature associated with the common public key.

The request may be broadcast by a device or a user thereof. The request may be broadcast to a plurality of stationary nodes within broadcast range of the device or within a range chosen by the user.

This method provides the advantage that a user of the method may determine their location and obtain a cryptographic signature which confirms that location is authentic without the user, or any other participant in the method, determining any cryptographic secrets or private keys, and achieving, by use of threshold secret sharing, a desired level of security and trust in the authentication.

Each location data may comprise a distance attribute and the method may further comprise the step of ranking the public keys based on the distance attributes, and wherein the step of selecting a common public key which is common to the set of the plurality of nodes is performed based on the outcome of the ranking.

The distance attributes may comprise a distance from respective nodes. The ranking may comprise ranking the public keys in order of said distances.

This provides the advantage of increasing the likelihood of determining an accurate location.

The step of broadcasting the request for location data may comprise broadcasting an identifier for identifying the broadcaster.

This provides the advantage of enabling the identity of the user to be verified, thereby increasing the security of the method.

The step of receiving location data may comprise receiving, from each of the plurality of nodes, a public key associated with a respective at least one node.

This enables a user to more easily identify the origin of any information they receive from the plurality of nodes, and enable the user to encrypt any further communications with particular nodes if desired.

The step of requesting the set of nodes to participate in threshold secret sharing to obtain a cryptographic signature associated with the common public key may comprise providing data to be signed. The data to be signed may comprise a message, a hash of a message, and an identifier for identifying the broadcaster. The message itself may be a concatenation of the hash of the message and the identifier.

This provides the advantage of linking the data to be signed and the signature itself to the particular user, enabling subsequent checks to be performed on the identity of the user, thereby increasing the security of the method.

The method may further comprise the step of receiving from at least one node a respective node signature associated with at least a public key of the node, validating the at least one node signature, and determining whether to request a node to participate in threshold secret sharing based on an outcome of said validation.

This enables the user to determine whether or not to trust a particular node by enabling the user to detect a spoofing attempt, thereby increasing the safety of the user.

The node signature may be associated with any of the message, the hash of the message, the identifier for identifying the broadcaster, the location data, and the node public key.

The method may further comprise the step of sending to at least one node a share portion of a cryptographic secret.

The method may further comprise the step of relaying from at least one node to at least one further node a function value encrypted with a public key of the respective at least one further node.

The method may further comprise the step of receiving from the plurality of nodes a respective plurality of parts of an intermediate cryptographic value, combining said parts into the intermediate value, and sending the intermediate value to at least one further node.

The method may further comprise the step of receiving from the plurality of nodes a respective plurality of parts of the cryptographic signature and combining said plurality of parts into a component of the cryptographic signature.

Each of these steps involves the user in communications which may have been carried out between the nodes, thereby providing the advantages of increasing the number of opportunities for confirming the relative locations of the user and the nodes and updating the content of communications therebetween, and enabling the user to check the outcome of intermediate steps of the signature calculation.

The method may further comprise the step of redeeming a blockchain transaction by supplying thereto the cryptographic signature. The blockchain transaction may comprise an identifier for identifying the broadcaster of the request, i.e. the user.

This provides the advantage of enabling any interested party to verify the identity of the user, given that the blockchain provides a permanent, public, and immutable record.

Additionally or alternatively, in accordance with the disclosure, there may be provided a computer implemented method, comprising the steps of:
receiving a request for location data;
determining a distance attribute associated with the request;
sending location data comprising the distance attribute and at least one public key corresponding to a respective at least one adjacent area;
receiving a request to participate in threshold secret sharing to provide a cryptographic signature associated with a common public key; and
collaborating, with a plurality of nodes, in threshold secret sharing to obtain the cryptographic signature.

The request for location data may have originated from a device operated by a user seeking to prove their location, who may be referred to as a nomad. The location data itself may be sent to the nomad for reception by the nomad's device. The request to participate in secret sharing may have originated from the nomad's device. The cryptographic signature may be sent to the nomad once it has been obtained.

This method provides the advantage of determining an authentic location of a broadcaster of the request for location data without the broadcaster, or any other participant in the method, from determining any cryptographic secrets or private keys, and achieving, by use of threshold secret sharing, a desired level of security and trust in the authentication.

The method may further comprise the step of determining a further distance attribute. The step of determining a distance attribute may comprise a time of flight measurement. The further distance attribute may be a distance between the user of the method, i.e. a first node, and another user, i.e. a second node.

This provides the advantage of enabling a user to determine how accurate any subsequent calculations performed using said distance attributes are, such as trilateration calculations, and provides the additional advantage of enabling the user to check the further distance attribute against a previously-obtained attribute to verify that other users are genuine.

The step of receiving the request for location data may comprise receiving an identifier for identifying the broadcaster of the request.

This provides the advantage of enabling a user to verify the identity of the broadcaster, such as by enabling the user to compare the identifier to entries in a table or to transactions in an unspent transaction output database of a blockchain, or to transactions on the blockchain.

The step of receiving the request to participate in threshold secret sharing to obtain a cryptographic signature associated with the common public key may comprise receiving data to be signed. The data to be signed may comprise a message, a hash of a message, and an identifier for identifying the broadcaster.

This provides the advantage of linking the data to be signed and the signature itself to the particular broadcaster, enabling subsequent checks to be performed on the identity of the broadcaster, thereby increasing the security of the method.

The step of sending location data may further comprise sending a node public key. The node public key may be associated with the user, i.e. the node, carrying out the method.

This provides the advantage of identifying the user sending the location data, and particularly in that the identifier provides a means of encrypting subsequent communications which are only decipherable by the intended recipient node.

The method may further comprise the step of sending to the broadcaster a node signature associated with at least a public key of the node.

This enables the broadcaster to validate the communication from the user, thereby increasing the security of the method.

The node signature may be further associated with any of the message, the hash of the message, the identifier for identifying the broadcaster, the location data, and the node public key.

This provides the advantage of extending the validation to validate any of the above-mentioned data.

The method may further comprise the step of sending to the broadcaster a share portion of a cryptographic secret.

The method may further comprise the step of sending to the broadcaster at least one function value calculated from a respective value associated with at least one node.

The method may further comprise the step of sending to the broadcaster a part of an intermediate cryptographic value and receiving the intermediate value.

The method may further comprise the step of sending to the broadcaster a part of the cryptographic signature.

Each of these steps involves the broadcaster in communications which may have been carried out between the users, thereby providing the advantages of increasing the number of opportunities for confirming the relative locations of the broadcaster and the users and updating the content of communications therebetween, and enabling the broadcaster to check the outcome of intermediate steps of the signature calculation.

The method may further comprising the step of receiving further location data associated with a plurality of the nodes, performing a trilateration calculation to determine a calculated location of the broadcaster, comparing the calculated location to at least the location data, and determining whether to participate in the threshold secret sharing based on an outcome of said comparison.

This enables the user to refuse to participate, or stop participating, in the method in the event that the broadcaster moves out of a desired range of the user.

In all of the above steps, the broadcaster may be understood to be a nomad.

Additionally or alternatively, in accordance with the disclosure, there may be provided a computer-implemented system comprising:
a processor; and
memory including executable instructions that, as a result of execution by the processor, causes the system to perform any embodiment of a computer-implemented method described herein.

Additionally or alternatively, in accordance with the disclosure, there may be provided a non-transitory computer-readable storage medium having stored thereon executable instructions that, as a result of being executed by a processor of a computer system, cause the computer system to at least perform an embodiment of a method described herein.

Figure 2:
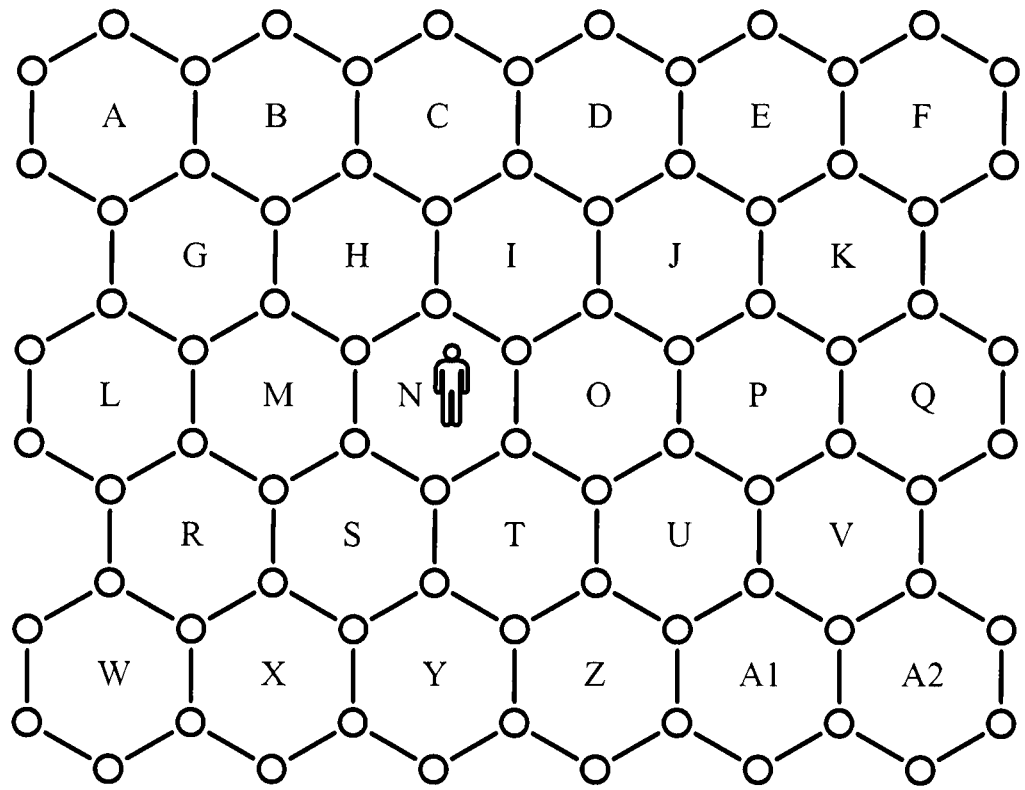
FIG. 2 is schematic illustration of an arrangement of HexAnchors of an embodiment.
Figure 3:
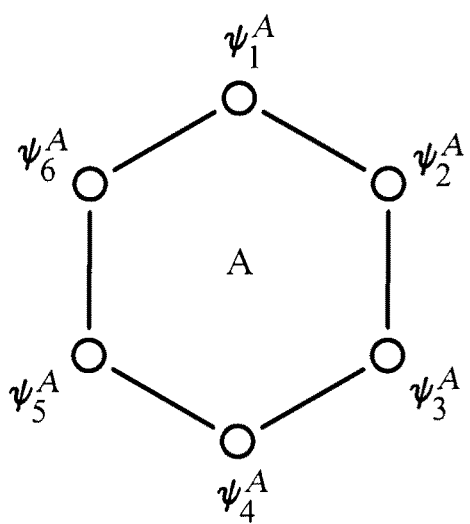
FIG. 3 is a detailed schematic illustration of a group of HexAnchors of an embodiment.
Figure 4:
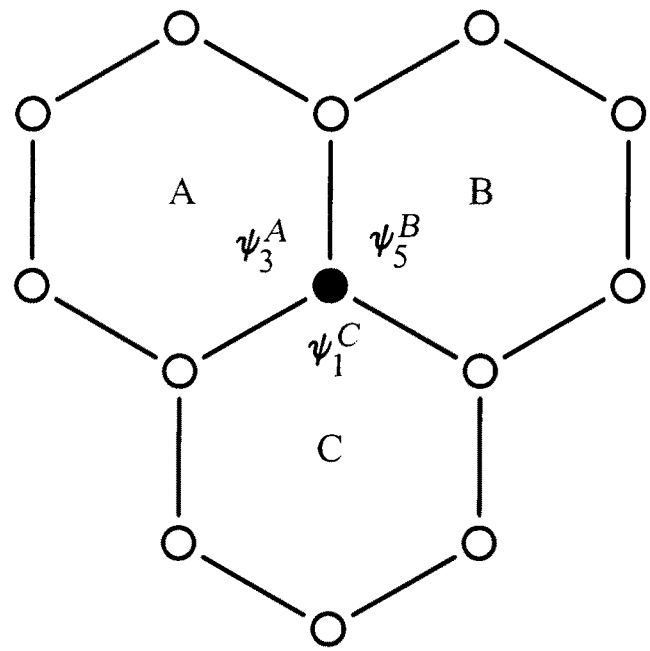
FIG. 4 is a schematic illustration of a plurality of groups of HexAnchors having a common HexAnchor vertex.
Figure 5:
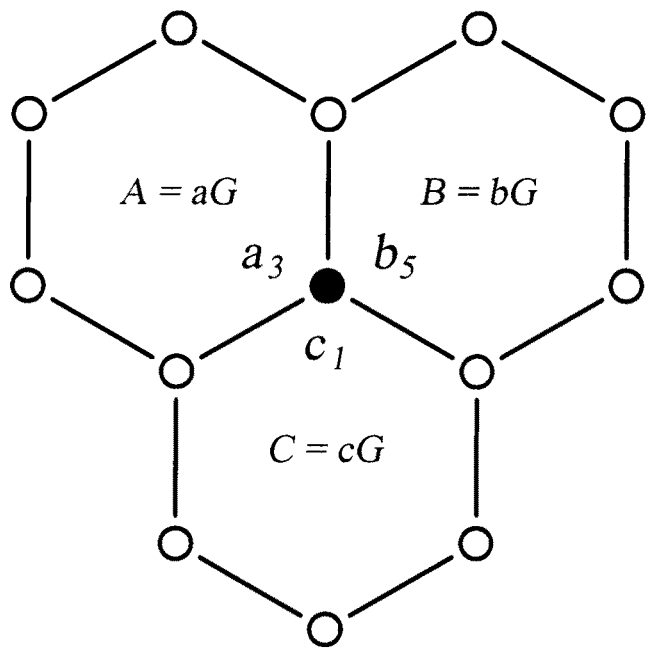
FIG. 5 shows keyshares allocated to the vertex of FIG. 4 according to an embodiment.
Figure 6:
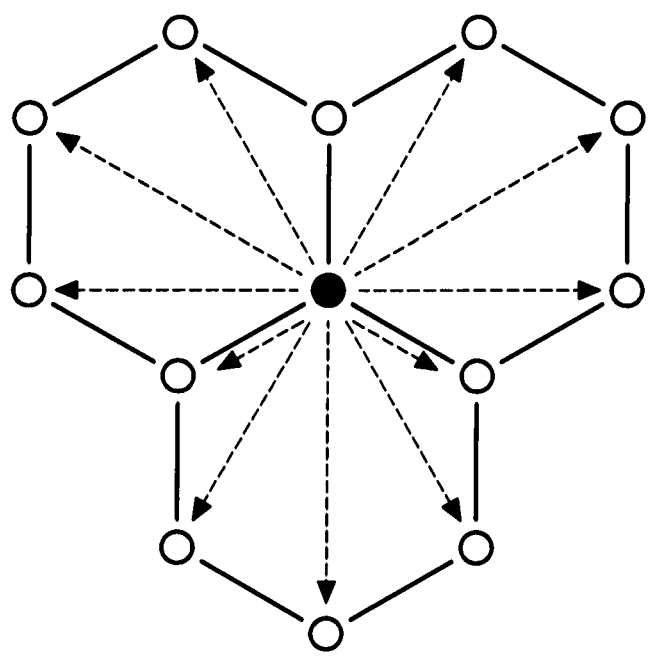
FIG. 6 illustrates the distances from the vertex of FIGS. 4 and 5 to HexAnchors in a HexSet of an embodiment.
Figure 7:
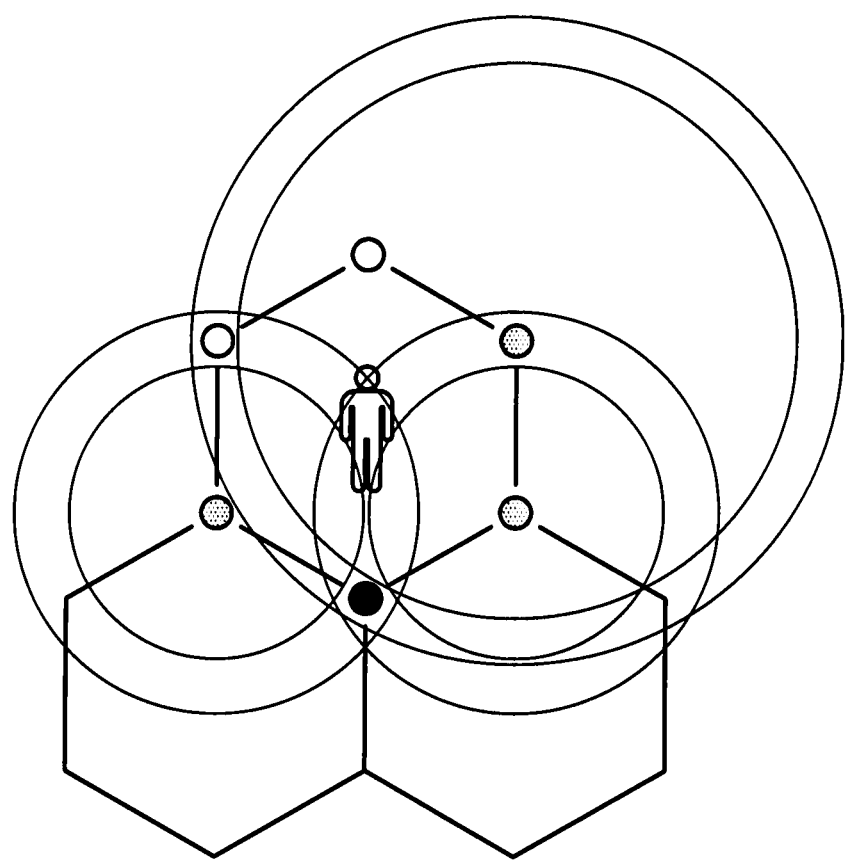
FIG. 7 illustrates a group of the HexAnchors of FIGS. 4 to 6 confirming a location of the vertex according to an embodiment.
Figure 8:
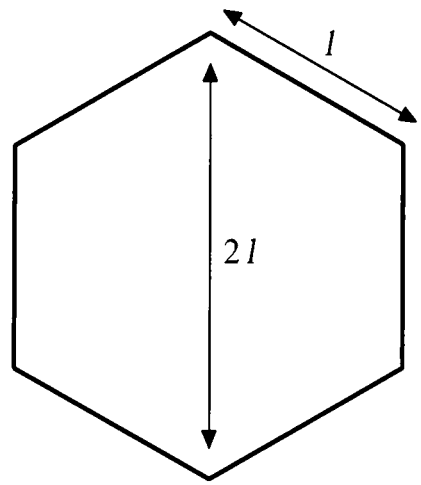
FIG. 8 illustrates the maximum separation between two vertices of a hexagon of given side length.
Figure 9:
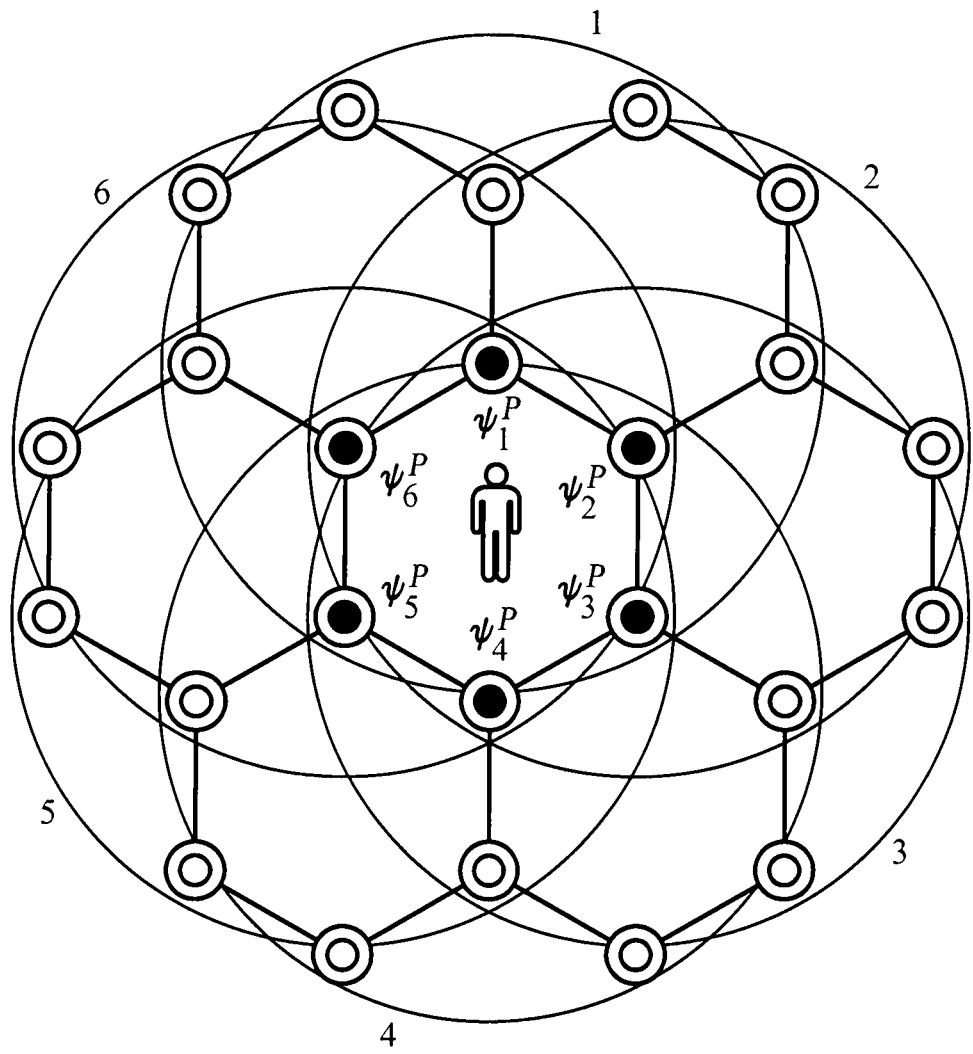
FIG. 9 is a schematic illustration of overlapping ranges of a plurality of HexAnchors of an embodiment.
Figure 10:
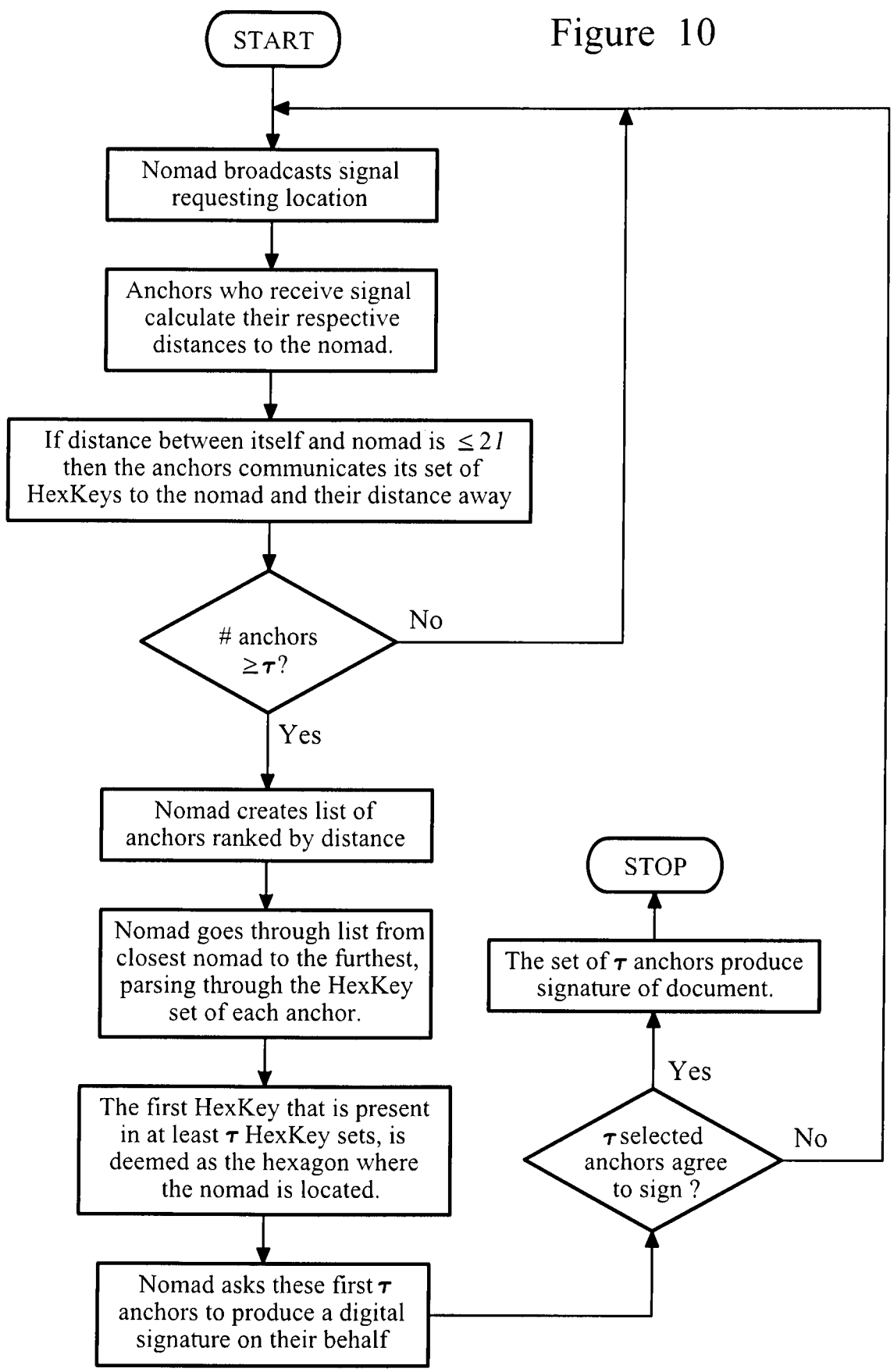
FIG. 10 is a flow chart demonstrating the steps of an embodiment.
Figure 11:
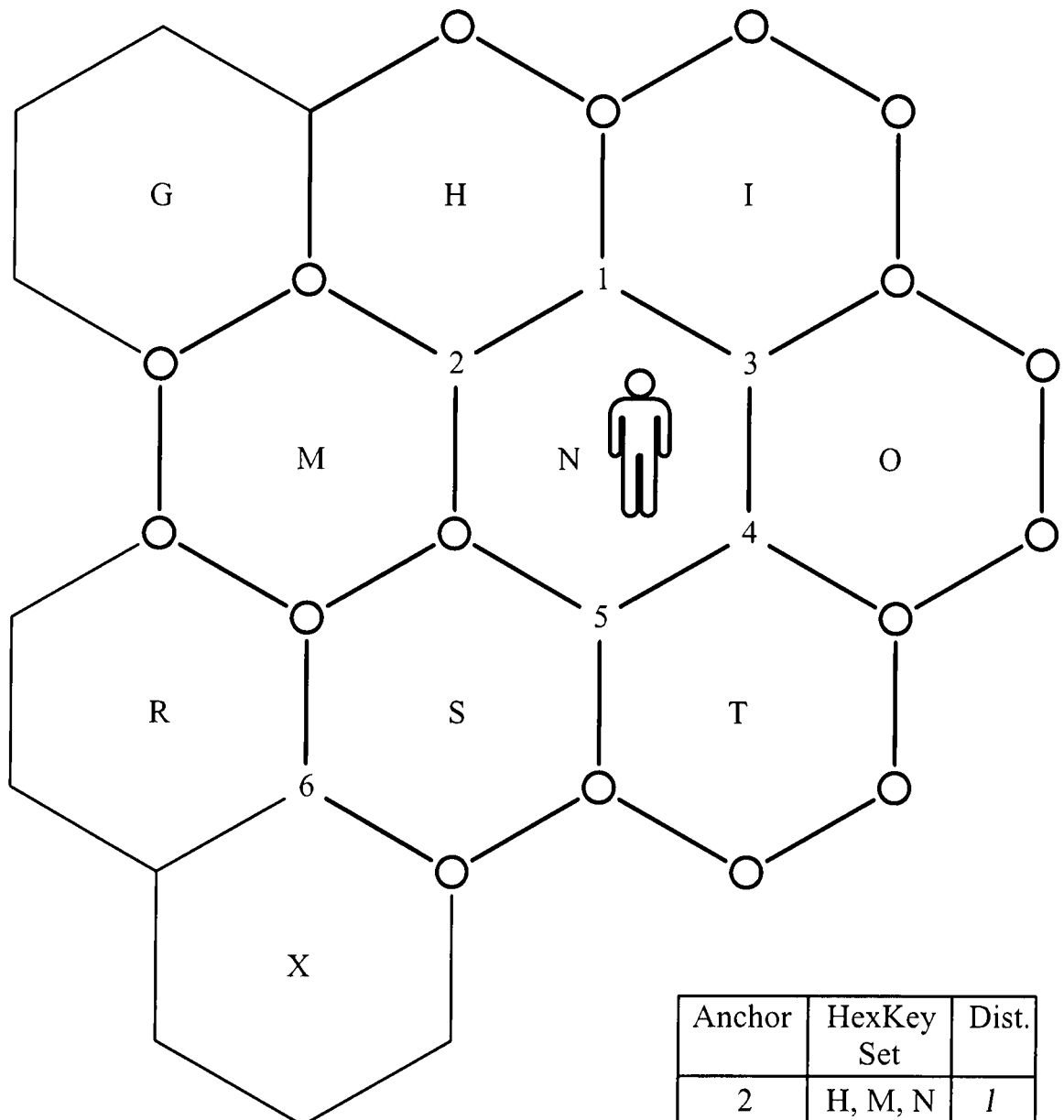
FIG. 11 illustrates a user relative to a plurality of Hex-Anchors together with an ordered table of HexKeys in accordance with an embodiment.
Figure 12:
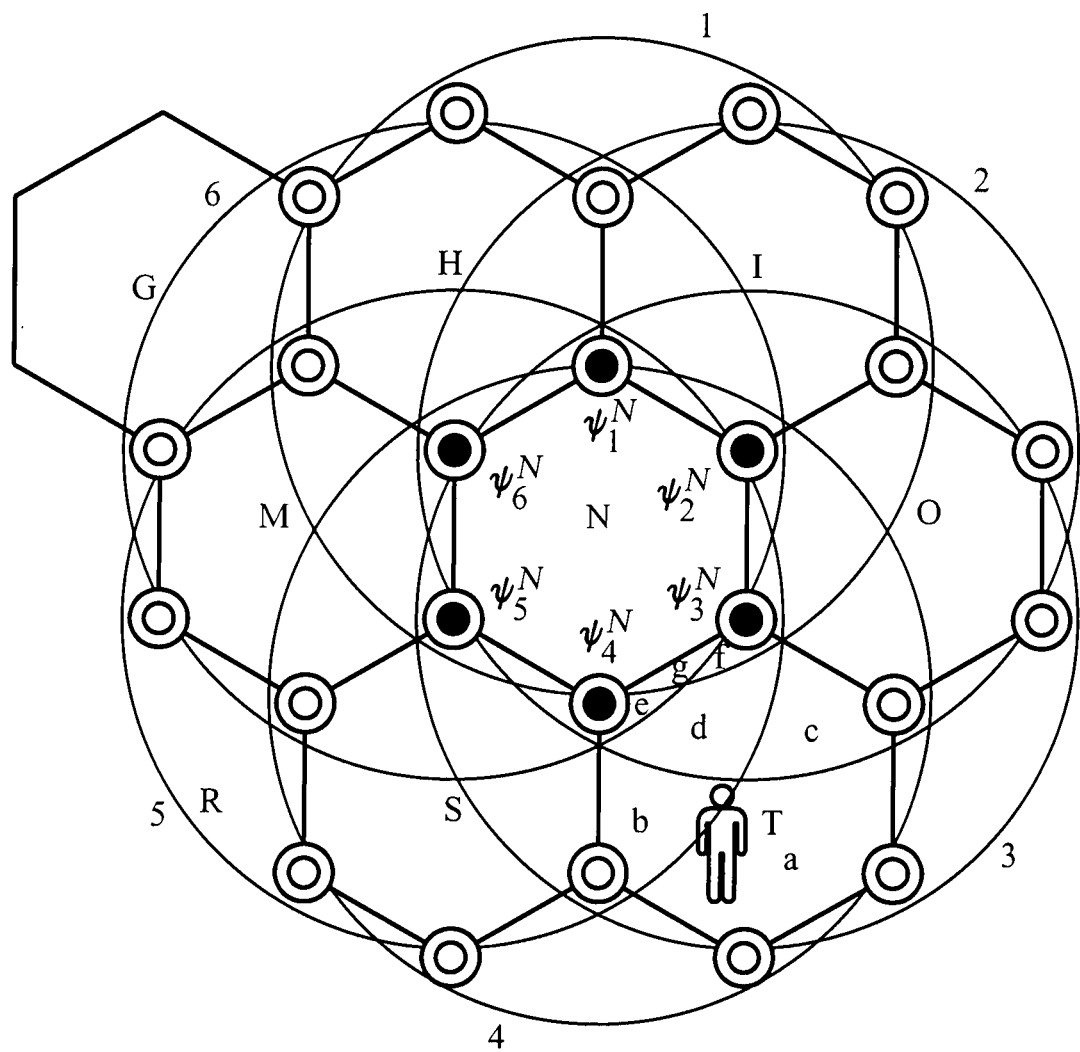
FIG. 12 is a schematic illustration of overlapping ranges of a plurality of HexAnchors of an embodiment.
Figure 13:
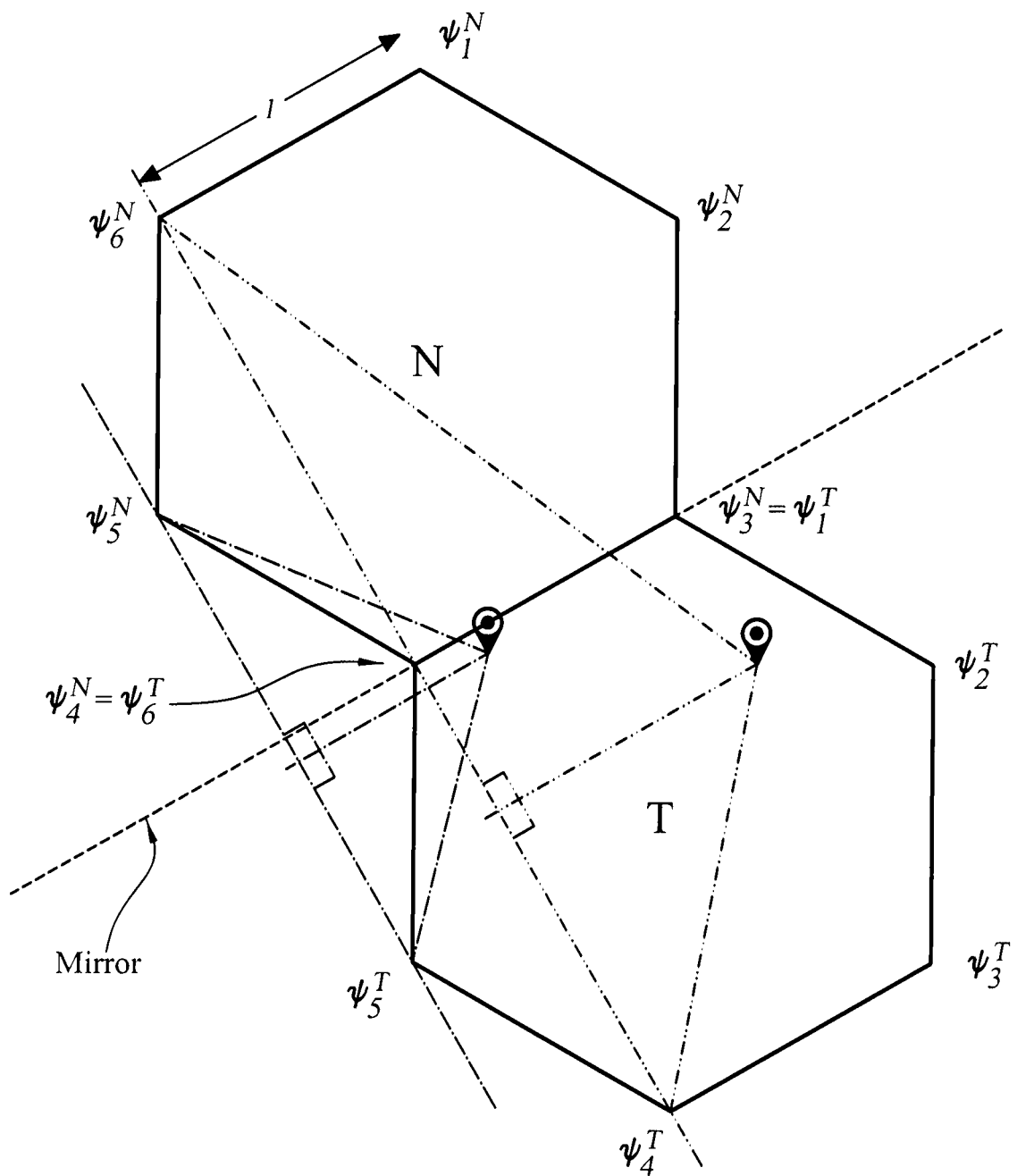
FIG. 13 is a schematic illustration of geometry of an embodiment.
Figure 14:
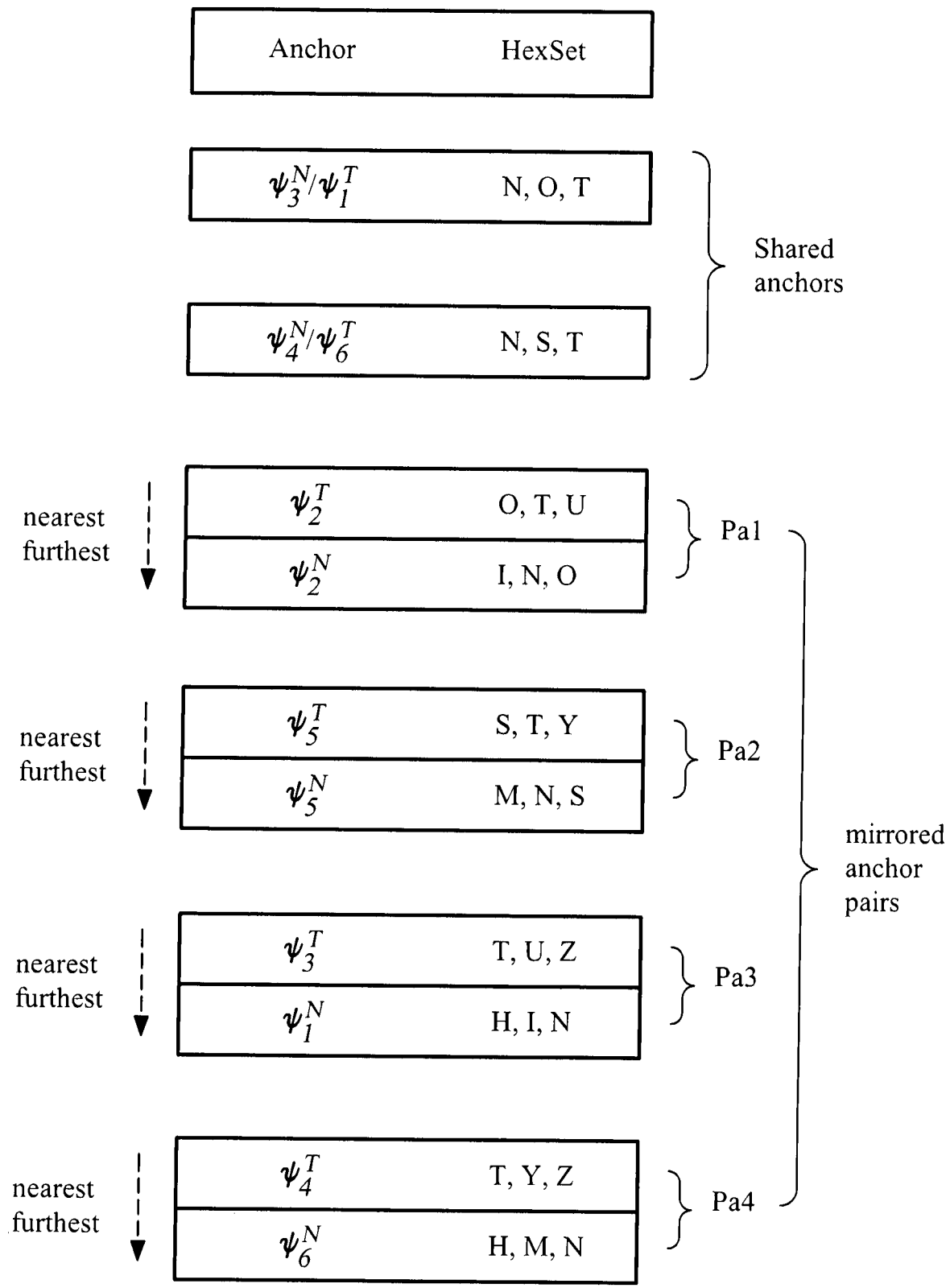
FIG. 14 is a table showing an ordering of HexAnchors in an embodiment.
Figure 15:
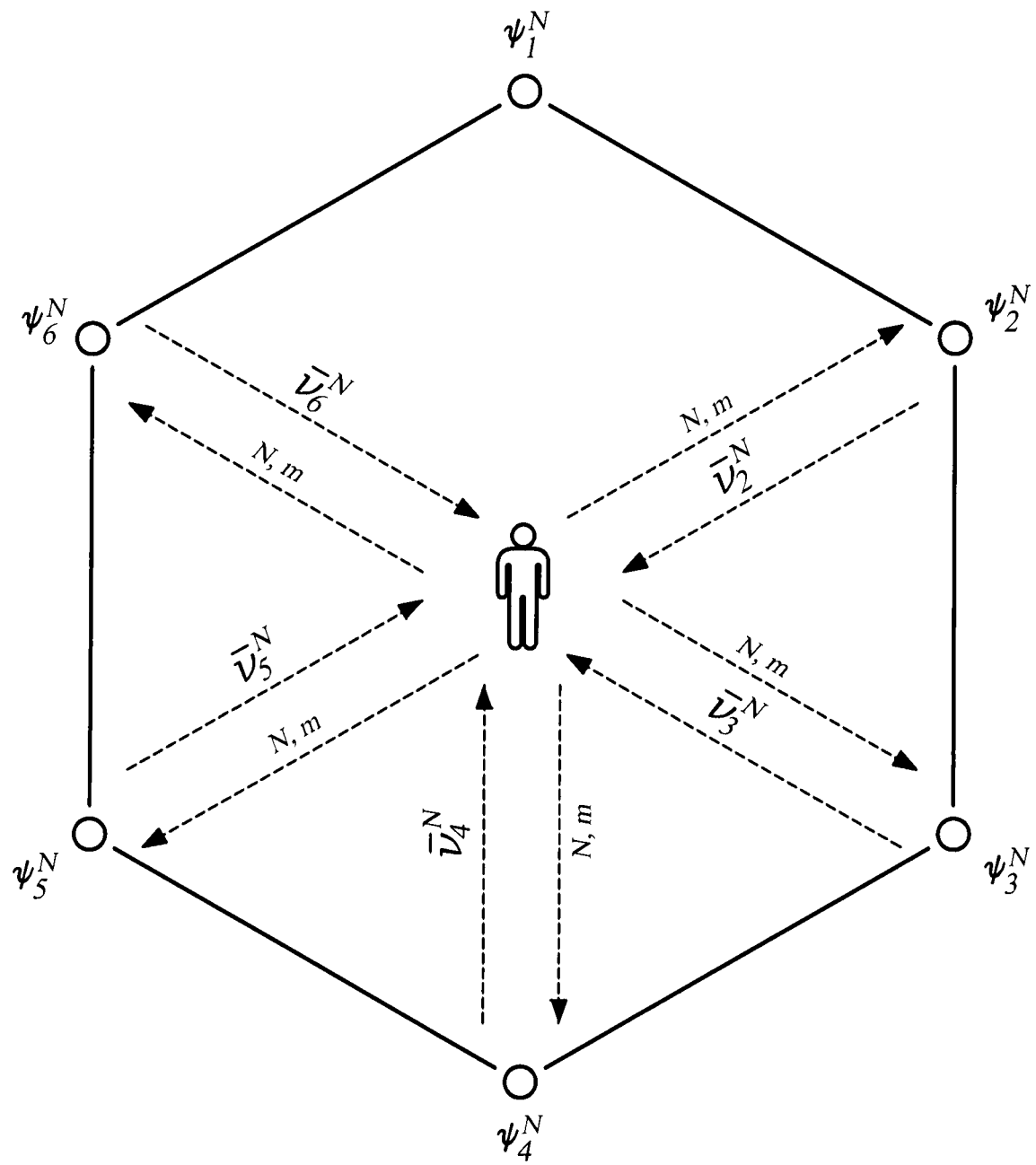
FIG. 15 is a schematic illustration of communication between a user and a plurality of HexAnchors in an embodiment.
Figure 16:
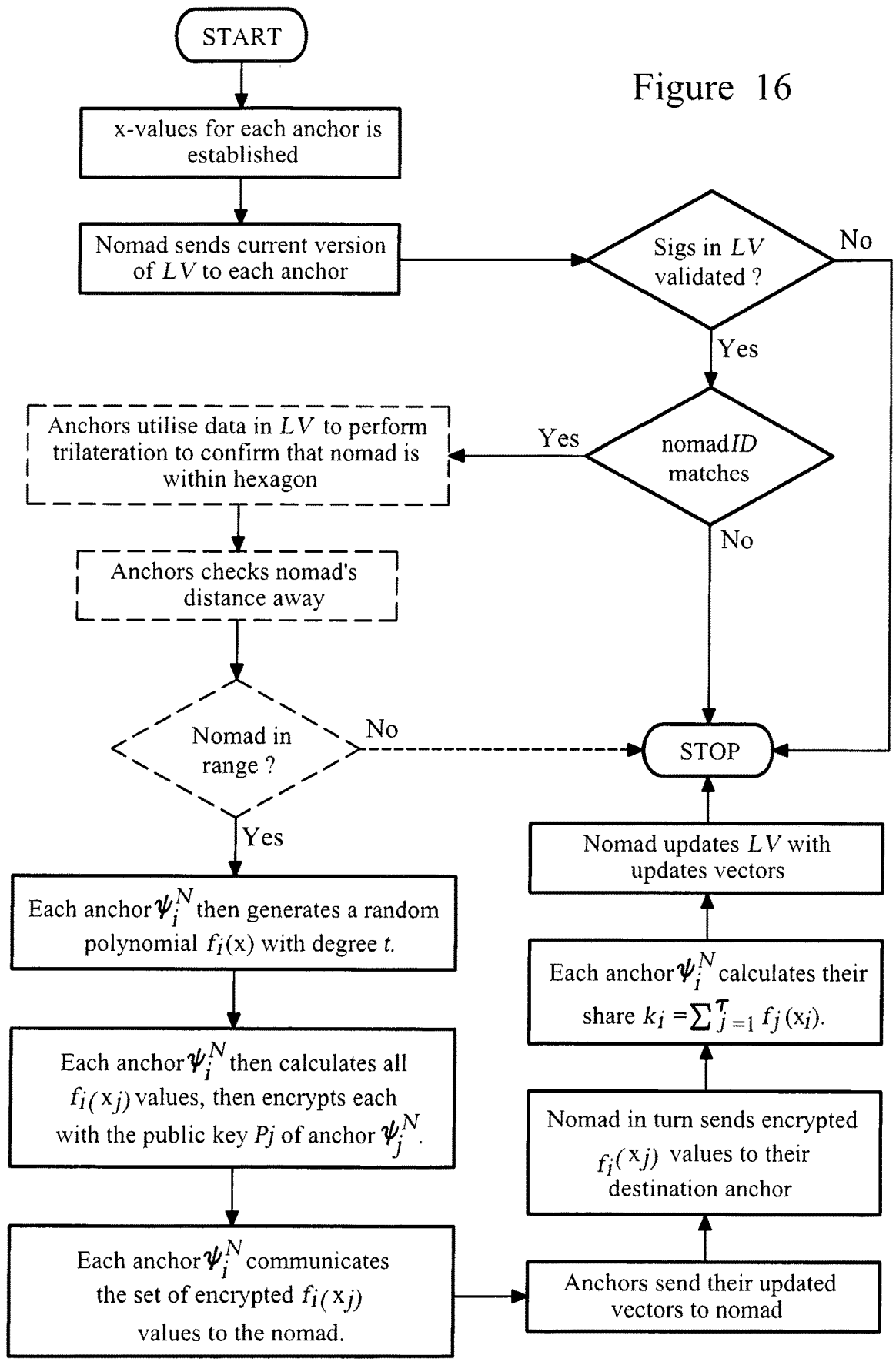
FIG. 16 is a flow chart demonstrating the steps of an embodiment.
Figure 17:
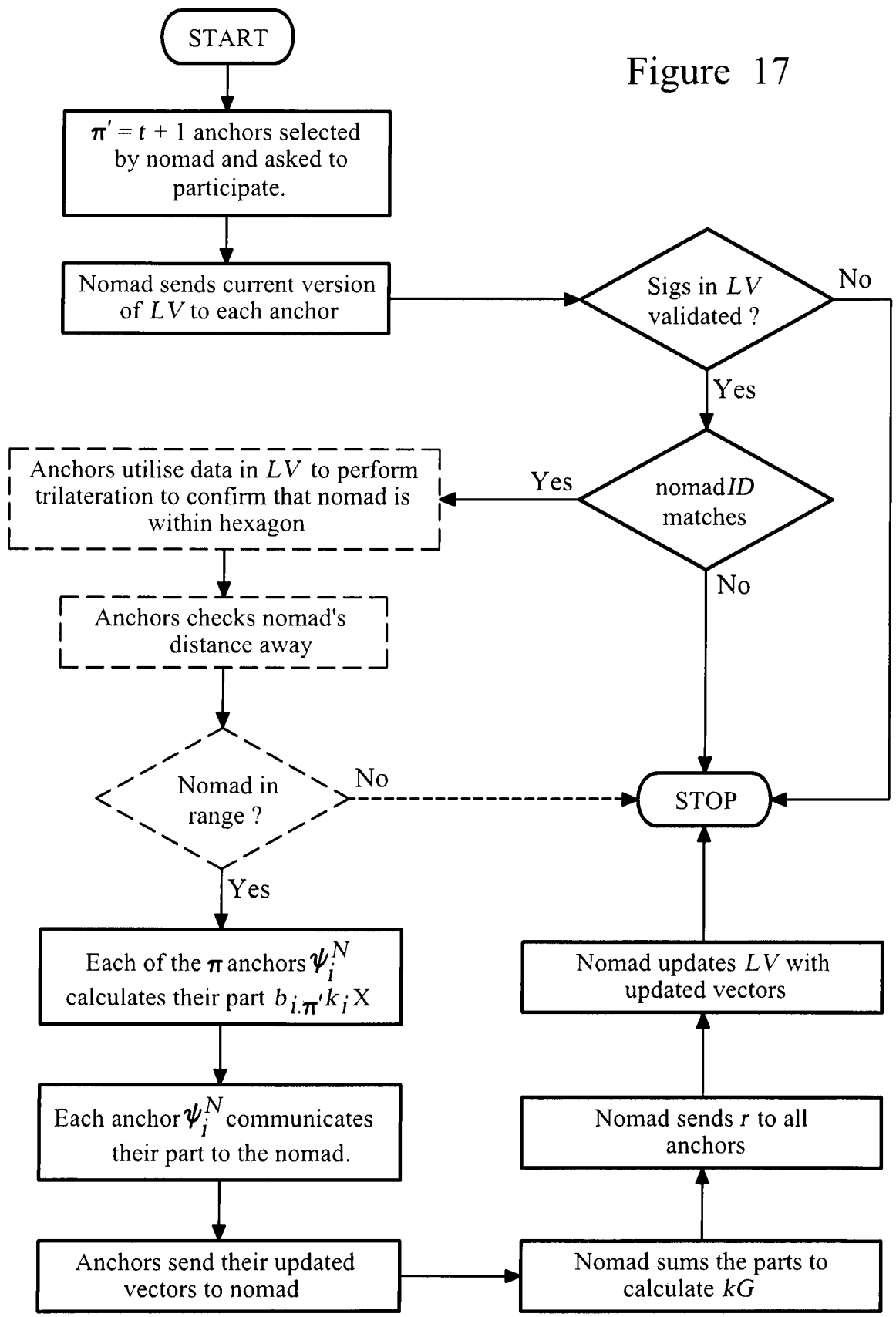
FIG. 17 is a flow chart demonstrating the steps of an embodiment.
Figure 18:
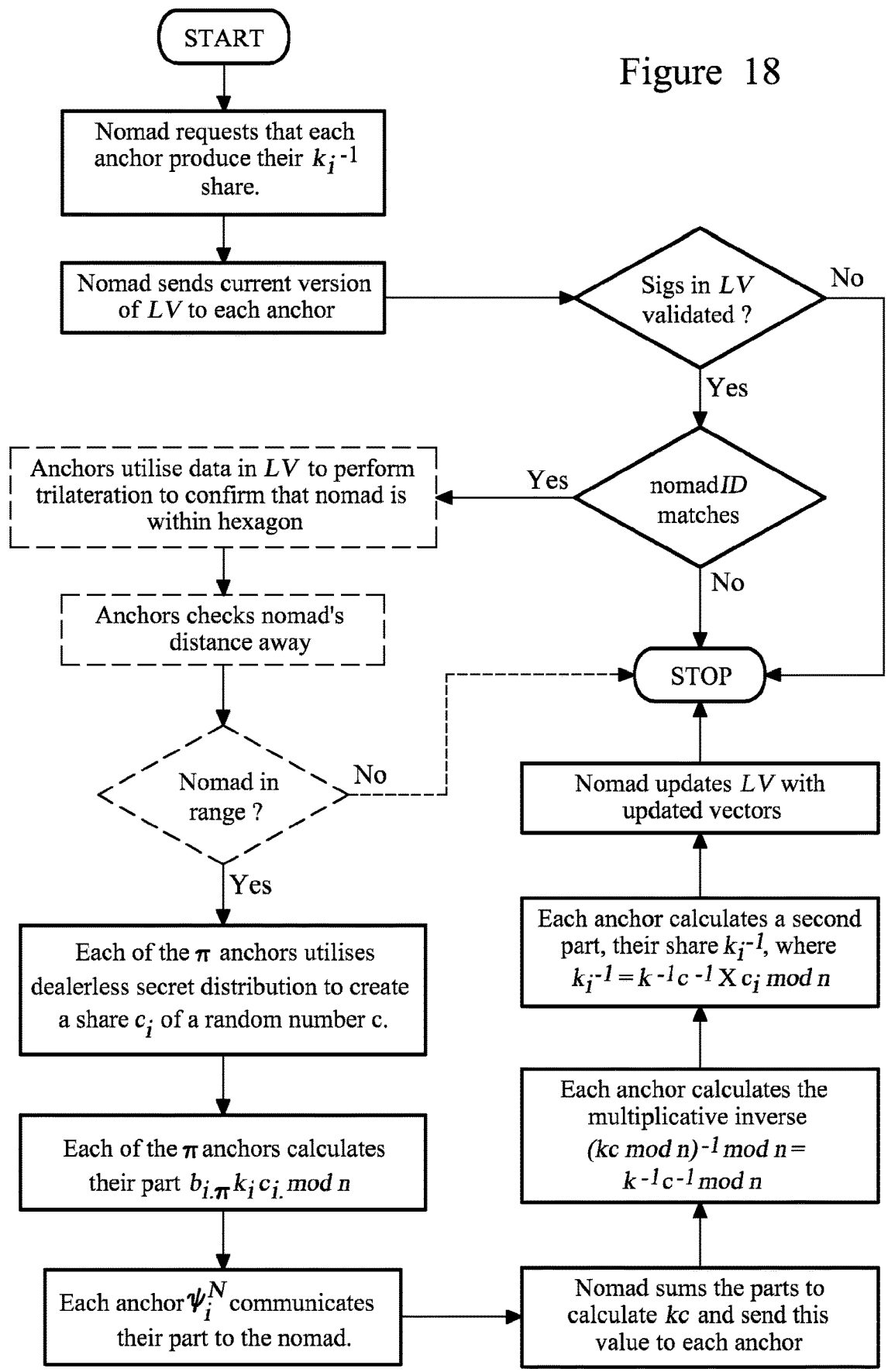
FIG. 18 is a flow chart demonstrating the steps of an embodiment.
Figure 19:
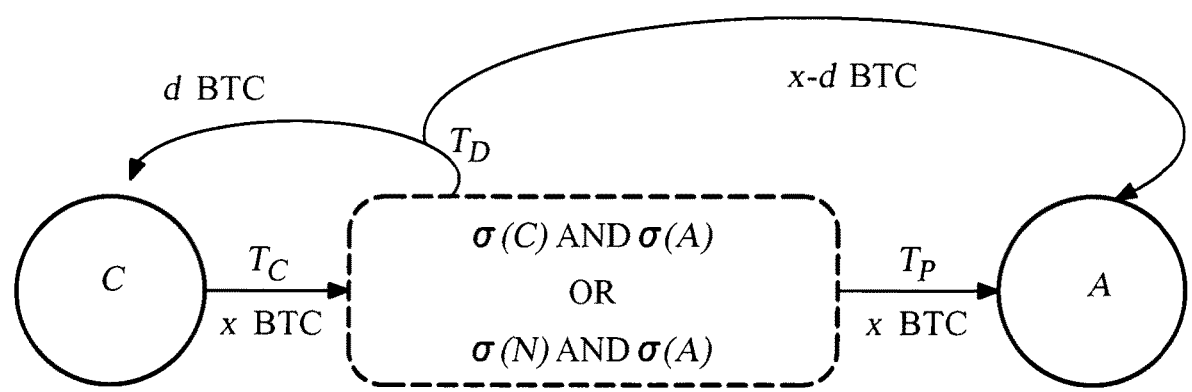
FIG. 19 is a schematic illustration of a blockchain commitment channel of an embodiment.
Figure 20:
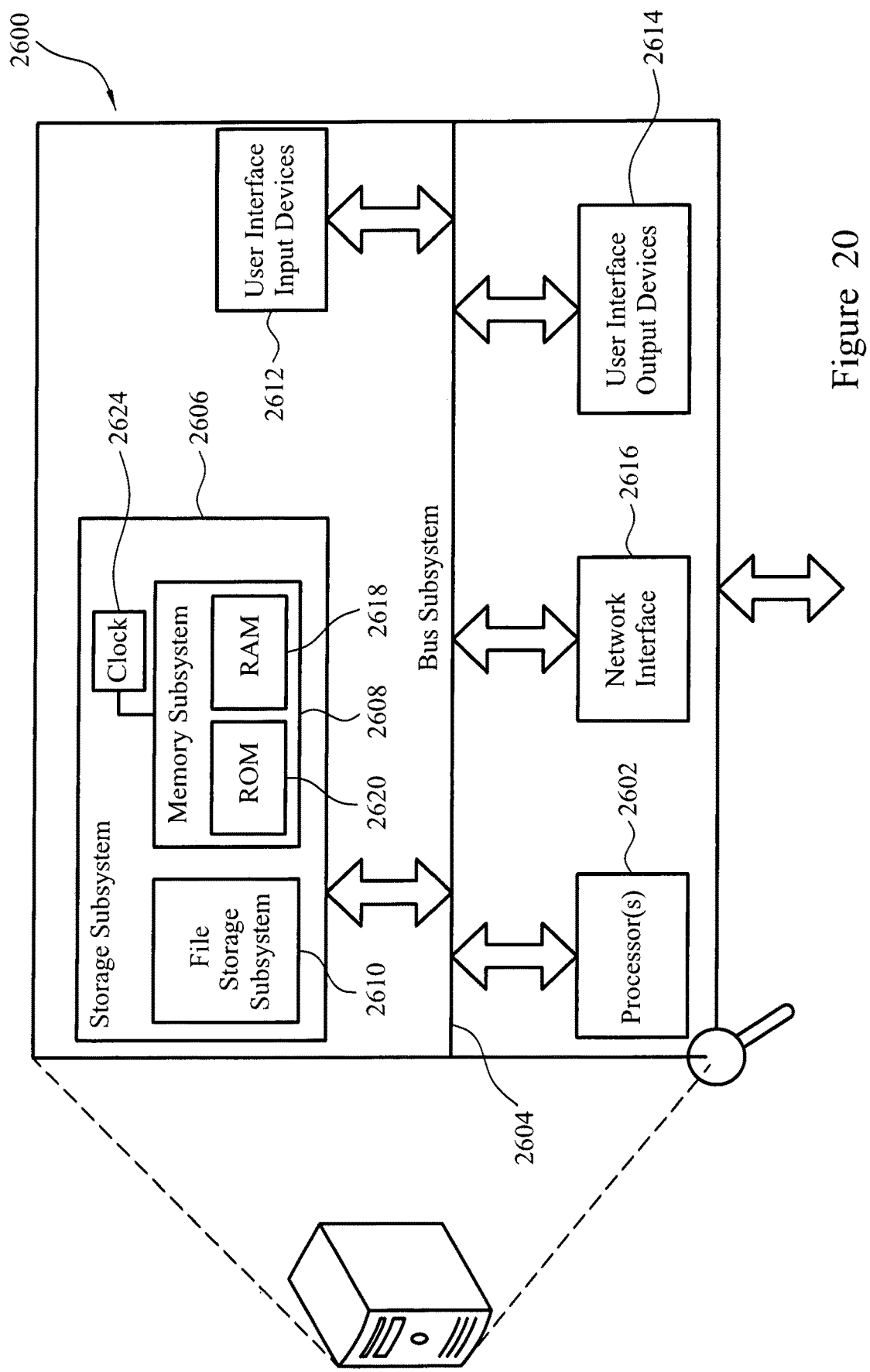
FIG. 20 is a schematic diagram illustrates a computing environment in which various embodiments can be implemented.

These and other aspects of the present disclosure will be apparent from and elucidated with reference to, the embodiment described herein. An embodiment of the present disclosure will now be described, by way of example only, and with reference to the accompany drawings, in which:

FIG. 1 shows a tessellation of a 2D plane into discrete, hexagonal geographical units;

FIG. 2 is schematic illustration of an arrangement of HexAnchors of an embodiment;

FIG. 3 is a detailed schematic illustration of a group of HexAnchors of an embodiment;

FIG. 4 is a schematic illustration of a plurality of groups of HexAnchors having a common HexAnchor vertex;

FIG. 5 shows keyshares allocated to the vertex of FIG. 4 according to an embodiment;

FIG. 6 illustrates the distances from the vertex of FIGS. 4 and 5 to HexAnchors in a HexSet of an embodiment;

FIG. 7 illustrates a group of the HexAnchors of FIGS. 4 to 6 confirming a location of the vertex according to an embodiment;

FIG. 8 illustrates the maximum separation between two vertices of a hexagon of given side length;

FIG. 9 is a schematic illustration of overlapping ranges of a plurality of HexAnchors of an embodiment;

FIG. 10 is a flow chart demonstrating the steps of an embodiment;

FIG. 11 illustrates a user relative to a plurality of HexAnchors together with an ordered table of HexKeys in accordance with an embodiment;

FIG. 12 is a schematic illustration of overlapping ranges of a plurality of HexAnchors of an embodiment;

FIG. 13 is a schematic illustration of geometry of an embodiment;

FIG. 14 is a table showing an ordering of HexAnchors in an embodiment;

FIG. 15 is a schematic illustration of communication between a user and a plurality of HexAnchors in an embodiment;

FIG. 16 is a flow chart demonstrating the steps of an embodiment;

FIG. 17 is a flow chart demonstrating the steps of an embodiment;

FIG. 18 is a flow chart demonstrating the steps of an embodiment;

FIG. 19 is a schematic illustration of a blockchain commitment channel of an embodiment; and FIG. 20 is a schematic diagram illustrates a computing environment in which various embodiments can be implemented.

Within commerce there are scenarios where a sender may want to restrict a receiver from gaining access to a resource, or control of a transaction, such as a Bitcoin transaction, unless the receiver is at or near a certain geographic location. One may consider the use of a taxi or a driverless car where the driver or car does not gain control of a transaction from the passenger unless the driver takes the passenger where the passenger needs to be.

The advent of cryptocurrencies and their associated scripting languages have presented the opportunity for advanced or sophisticated conditions to be integrated in transactions that enable the control of a transaction to pass to a receiver. In the case of user location, there is a danger that while the criteria for unlocking control may require user-location, the receiver may easily input the required location data without being at that the specific location. "Location data" refers to any information which specifies a location, such as the location of a device which requests said data. Location data may include a distance attribute, which may include a distance to the nomad as determined by a device which receives said request.

Herein a system is described relating to a geospatial protocol for the integration of geographical criteria into cryptocurrency transactions. The solution includes the use of threshold signatures produced by nodes situated at predetermined geographical locations where a collaboratively produced digital signature acts as proof of the user's location. From hereon, a "node" refers to an electronic device having at least a processor and memory and capable of receiving and transmitting digital information, performing calculations, and preferably capable of interacting with the blockchain.

One of the more notable aspects of Bitcoin on its introduction was its inclusion of a Script language that gives users flexibility in creating criteria for the redemption of a transaction. The available opcodes afford the ability to construct criteria that range from the simplicity of sending to a public key to more sophisticated 'smart contract' type conditions.

To successfully submit a transaction to the blockchain a sender must include required data within the input script of the receiver's transaction. This includes signatures and other alphanumeric content. In some cases, the correctness of the data can be assessed by opcodes within the sender's output script, however, despite the data being 'correct', there is the additional concern of whether the data included in the script is 'legitimate'.

Given that the data would have to be correct in order for the script to execute successfully, 'legitimacy' in this context relates to the question of whether the correct actions were undertaken to acquire the data and whether the data was obtained from a certified source.

An example of the previously mentioned data concerns is location-based applications that may be reliant on coordinates or other spatial representation type data; it may be required that a receiver be at a particular location in order to receive a payment. To receive their payment the receiver could provide their coordinate data in the script, but knowing these coordinates does not necessarily mean that the receiver (also referred to as a nomad throughout) is at the specified location. It is desirable to certify that the nomad is at the specified location.

Disclosed herein is the Proof of Location CErtification System (PLaCES) protocol, which provides a method which implements certification of a nomad's geospatial location for a Bitcoin transaction. The certification of the nomad's location is represented by a bitcoin-compatible ECDSA digital signature and the proposed protocol is designed so as to ensure (at least with a high probability) that the nomad is or was at or near a specific location in order to obtain the signature. A Threshold Signature Scheme (TSS) is utilised to achieve a satisfactory level of consensus on that location. Anchors at vertices of hexagons of a hexagon-tessellated plane collaborate to produce the signature, as described in detail below.

Threshold Secret Sharing (TSS) is a cryptography mechanism where a private key is divided into keyshares, wherein the private key may be reconstituted by collaboration of at least a threshold number of holders of the shares.

The PLaCES protocol addresses authentication limitations of GPS in that users of the protocol have a high level of assurance that the geolocation data is derived from a verified source(s).

Within the PLaCES protocol, to authenticate their location, a nomad obtains a digital signature which corresponds to that location—more specifically, a digital signature for a point on an Elliptic Curve.

It is desirable that nodes carrying out the protocol, called HexAnchor nodes and described in detail below, are able to verify that they are given correct secret shares. For keyshare verification a Publicly Verifiable Secret Sharing scheme (PVSS) may be employed which allows nodes to verify their own shares as well as the shares of the other nodes.

The PLaCES protocol provides authentication of a nomad's location for the purposes of blockchain/cryptocurrency services as well as other systems that require and/or desire authenticated user location. A nomad is an individual that is asked to provide their location and is a user of the protocol.

In the PLaCES protocol, the authentication of a nomad's location is achieved by the production of a digital signature. This signature is constructed when a sufficient number of participating HexAnchors agree that the nomad satisfies certain criteria, such as location and/or distance conditions.

Whereas locations for GPS and FOAM are latitude and longitude based, the PLaCES protocol is designed for an agreed-upon set of discrete geographical units (for example, postcodes). The physical area which PLaCES covers is subdivided or tessellated into these discrete geographical units. 'Tessellation' is "an arrangement of shapes closely fitted together, especially of polygons in a repeated pattern without gaps or overlapping" (en.oxforddictionaries.com/definition/tessellation). Each geographical unit is preferably in the shape of a regular hexagon (6-sided polygon), though other shapes, both regular and irregular, are entirely possible. From hereon, PLaCES is described with reference to hexagonal geographical units.

The surface area (or corresponding length of each edge) of each polygon would be dependent on a combination of the level of location-granularity required, the strength of radio signals from HexAnchors, cost, and logistical concerns.

Each hexagon in the 2-dimensional plane is assigned an identifier. Each identifier (titled as HexKey for our purposes) is or is representative of an Elliptic Curve (EC) public key. An EC public key P is such that $$P = pG$$

where G is a base or generator point on the Elliptic Curve and p is a private key.

A nomad wanting to prove their location will be required to obtain a signature that corresponds to their location—their location being the hexagon in which the nomad is positioned, and the signature being one that was created with the private key of the corresponding HexKey.

As an example, the nomad in FIG. 2 is in the location that is tied to the public key N=nG. For the nomad to prove that they are at said location, the nomad would have to produce a digital signature based on the private key n.

Notably, neither the nomad nor anyone else has this private key, or indeed any other private key for any HexKey of the plane. This increases the security of the protocol, as no single actor or user is able to generate a HexKey signature.

HexAnchor is the name given to a node located at the vertex of a hexagon. Herein, the labelling convention $\psi_i^A$ refers to a HexAnchor where A is the HexKey and i is the index of the position of the node in the hexagon. Note that the convention defines the anchor at the top of the hexagon to have index i=1, and the indices are incremented in a clockwise direction, as shown in FIG. 3.

Being at the vertex of a hexagon means that, unless the anchor is at the outside edges of the 2D plane, the anchor is at the vertex of at least three hexagons. These three hexagons are three areas which are proximal to, or adjacent, the anchor, and are known as the anchor's HexSet. It is to be understood that a node is considered to be proximal to or adjacent an area, such as a hexagon, if there are no other nodes which are closer to that area than that node.

As an example, FIG. 4 shows three hexagons (A, B, C) in the HexSet for a HexAnchor, which is in the centre. Note that the HexAnchor can be labelled in three different ways, as $\psi_3^A = \psi_5^B = \psi_1^C$.

Each HexAnchor has a unique ID. This is to distinguish between HexAnchors. This unique ID is separate and apart from the $\psi_i^A$ labelling. This unique ID may be in the form of a public key or bitcoin address.

Each anchor is physically static. This means that the anchor does not physically move. While accidents and malicious actors may seek to physically displace nodes, the PLaCES protocol incorporates measures to mitigate against and/or identify misplaced anchors.

Each anchor has the ability to send and receive data, such as in the form of radio waves, to and from at least all other anchors found within the anchor's HexSet. These radio signals will be used, among other things, to determine the distance between anchors or nomad. Each anchor is able to perform clock synchronisation, via the anchor's radio transceivers or otherwise, with other anchors in the HexSet. PLaCES provides the ability for HexAnchors to be able to judge the distance to another HexAnchor. In order for this to be done successfully, the clocks for each anchor are synchronisable.

Each anchor has the ability to send and receive data, such as in the form of radio waves, to and from specially designed device possessed by a nomad who is inside any of the hexagons of the anchor's HexSet.

Each anchor is also a node in or has access to the blockchain network i.e. each HexAnchor has access to the blockchain or at least the UTXO set.

Central to the ability of PLaCES to certify a nomad's location is its use of Threshold Secret Sharing (TSS). TSS involves a private key x being 'divided' into multiple keyshares $\{x_i : i \in [1, n]\}$. The private key may be reconstituted only with a sufficient number of keyshares corresponding to the threshold of the scheme being met or exceeded. Where Shamir's polynomial approach is used, for a polynomial of order t, t+1 of n keyshares are required to determine the private key x.

It is possible to produce an ECDSA digital signature, based on a private key x, by utilising a sufficient amount of the $x_i$ keyshares. In such a case, if the polynomial is of order t, then $\tau = 2$ t+1 of n keyshares are required to produce the digital signature corresponding to the private key. This can be done without any participant revealing their personal keyshare.

As previously mentioned, in the PLaCES protocol, each hexagon is assigned a HexKey (EC public key) P=pG. For the corresponding private key p, each HexAnchor $\psi_i^P$ is assigned a keyshare $p_i$. Given that a HexAnchor is a vertex of up to three hexagons, each anchor may be assigned up to three different keyshares, each share corresponding to a different hexagon. As an example, in FIG. 5, the HexAnchor (shown in the centre) is in possession of a keyshare $a_3$ for hexagon A, a keyshare $b_5$ for hexagon B, and a keyshare $c_1$ for hexagon C.

The 'division' and/or distribution of the keyshares of the HexKeys can be done in two ways, as follows:
- having 'a dealer who knows the private key x' create the keyshares and have these keyshares communicated securely to each participant, or employing a dealerless solution where each party creates their own keyshare, and no party at any point knows the value of the private key x.

In the PLaCES protocol, either keyshare distribution method may be utilised, bearing in mind that each has its advantages and disadvantages as noted in the table below.

| Distribution | Advantage | Disadvantage |
| --- | --- | --- |
| Dealer-based | Simple to implement | Relies on trusting at least one individual who knows the keyshares for greater than one HexAnchor. |
| Dealerless | Only the HexAnchor knows its keyshare. | Complicated to implement |

In the case of the dealer-based option, a trusted supervising authority may distribute the keyshares to, not only to the HexAnchors of one hexagon, but to all the HexAnchors. Alternatively, each hexagon may have its own trusted authority that distributes the keyshares for only that hexagon.

Where the dealerless option is used, the HexAnchors of a hexagon collaborate to produce the keyshares of the private key of that hexagon.

There is a set-up period where the HexAnchors are placed in their respective positions according to the tessellation topology. Given the physical aspect of this positioning, each HexAnchor may not be able to be placed exactly at a location corresponding to a vertex of the tessellated topology. This could be due to topography, political, or logistical concerns. However, minor deviations of HexAnchors from their proposed locations do not affect the effectiveness of the PLaCES protocol.

Once the final locations of the HexAnchors are known, each HexAnchor $\psi_i^P$ knows the distance between itself and all other HexAnchors in the HexSet of $\psi_i^P$. See FIG. 6 for an illustration of this.

Note that apart from a HexAnchor $\psi_i^P$ being told what the distance ($y_{ij}$) is to the other HexAnchors, the anchor $\psi_i^P$ can confirm for itself that these anchors are actually at the stated distance. This 'confirmation of distance' (CoD) process may be carried out not only at the initial set-up of the anchors but at arbitrary times decided by each anchor.

Utilising a transceiver, such as a radio transceiver, based on the time taken to send a signal and receive a response signal, a HexAnchor $\psi_i^P$ is able to determine the distance of another HexAnchor $\psi_j^P$ from itself. Given that the exact location of $\psi_j^P$ may not be precisely known at the outset that and weather conditions or otherwise may affect the radio signal, there is no expectation or requirement that the 'on-paper' distance of $\psi_j^P$ will be exactly the same as the 'real-world' value, only that the real-world value of $y_{ij}$ is within a certain range. As an example, if the HexAnchor $\psi_j^P$ is on paper as being 100 m away from $\psi_i^P$, then $\psi_i^P$ may select a margin of error where it is willing to accept $\psi_j^P$ as being a real world distance, for example $y_{ij}=(100\pm5)$m.

Note that the anchor $\psi_i^P$ does not determine the exact location of the anchor $\psi_j^P$ but only the distance $y_{ij}$ away. With only the distance value, this means that $\psi_j^P$ can only establish that the anchor $\psi_j^P$ is somewhere on the circumference with radius $y_{ij}$. In order to establish the location of an anchor $\psi_j^P$, the distance between that anchor and at least three anchors is needed. If the distance of $\psi_j^P$ is correct from each of three honest anchors, then the location of $\psi_j^P$ is considered correct.

In order to produce the signature that confirms that a nomad is at a location, the collaboration of a sufficient number of HexAnchors is required. Since HexAnchors can individually and at arbitrary times perform a check to determine if any or every other collaborating anchor is at a required distance away, if one anchor $\psi_i^P$ is not satisfied with the distance measured to any other collaborating anchor $\psi_j^P$, then that HexAnchor $\psi_i^P$ may refuse to contribute to producing the digital signature for the nomad.

FIG. 7 shows three anchors performing a confirmation of distance check on an anchor of interest at the lowest point of the hexagon. Note that each anchor checks that the anchor of interest falls between two circumferences. These two circumferences of an anchor are the upper and lower limits of the expected distance away from the anchor of interest. If all anchors are happy that the anchor of interest falls within their pair of circumferences, then the anchor of interest may be accepted as within bounds of the correct location.

A HexAnchor is able to detect a nomad anywhere in the region covered by the anchor's HexSet. This, in addition to the ability to determine the distance of other anchors from itself, means that the radio signal strength of any HexAnchor is sufficient to reach the farthest vertex in any of the anchor's HexSet. Since the geographical units of this example are regular hexagons of side length l, this distance is 2l (see FIG. 8). Ranges for anchors shown in FIG. 9.

A nomad has a device that is able to broadcast and receive data, preferably in the form of radio signals. The device has a range that is sufficient to both send and receive signals and/or messages to nearby HexAnchors. Similar to the HexAnchors themselves, the minimum range of the nomad's beacon device is preferably 2l.

The device could be a dedicated device or a multifunctional device that includes radio functionality, such as a smartphone or tablet. Included in the device is a mechanism that gives the device a unique identity, such as a sim card of a mobile phone. Communications issued from such a device are difficult to fake or spoof.

A threshold value is established for the keyshares. This threshold value represents the minimum number of HexAnchors that are needed to form a consensus on the nomad's location (as well as anchor location). The threshold value (labelled r throughout) should be at least four, given that there need to be at least three anchors to determine an anchor's location in a three-dimensional volume, i.e. to successfully compute a trilateration calculation.

If an anchor of the $\tau\geq 4$ anchors is satisfied that distance and/or location criteria are satisfied for a nomad's location (and preferably also satisfied with the distances of all other anchors in the hexagon), then that anchor chooses to contribute to producing a signature certifying the nomad's location. If $\tau\geq 4$ anchors are satisfied then they can collaborate and successfully produce a digital signature for a hexagon's HexKey.

The steps the nomad takes in determining its location are described below. Note that the term nomad and its device may be used interchangeably for simplification purposes.

1. The nomad at a location broadcasts a signal declaring that it is seeking to establish its location. This broadcast includes the unique identifier of the device/nomad that was produced (e.g. of the sim card).
2. One or more HexAnchors receive this signal.
3. Each HexAnchor that receives this signal, through radio signal transmission and reception to and from the nomad, performs a calculation that determines the distance away that the nomad is from the HexAnchor. This may include one or more RF (Radio Frequency) calculations such as a time of flight calculation, which may involve transmitting some unique data from a first transceiver A and have said data echoed from a second transceiver B back to transceiver A, then measuring the time taken for the round trip. A distance between the two transceivers may then be calculated. Other Time Of Flight solutions including the usage of phase difference may be additionally or alternatively used.

4. If the nomad is within the distance of 2l from the HexAnchor, the anchor transmits to the nomad:
    a. the three HexKeys of the hexagons that the HexAnchor is responsible for,
    b. the distance between the HexAnchor and the nomad,
    c. the HexAnchor's public key, and
    d. any other information required for a bi-directional communication channel between the nomad and the HexAnchor.
5. The nomad will create a list of the responding HexAnchors ranked in order from the nearest to farthest.
6. Starting from the nearest anchor, the nomad goes through the list until it arrives at the first $\tau$ unique anchors that are responsible for a common HexKey. The common HexKey is a public key which is common to a set of the plurality of anchors. In this example, $\tau=5$.
7. The nomad then asks these r anchors to produce a digital signature on his behalf for that common HexKey.
8. The set of $\tau$ anchors collaborate to produce this signature. In so doing, the nomad may be involved in the relaying of data between the anchors and/or the processing of data received from the anchors prior to obtaining the complete signature.

The flowchart of FIG. 10 shows the sequence of actions involved in establishing the nomad's position.

Alternatively to Steps 5 and 6 above, other methods are available to the nomad to determine his location, for example:

Consider the nomad receiving the distance information shown in Table 1.

TABLE 1

| Anchor | HexKey Set | Dist |
|---|---|---|
| 2 | H, M, N | l |
| 3 | I, N, O | l |
| 5 | N, S, T | l |
| 4 | N, O, T | l |
| 6 | M, N, S | l |
| 1 | B, G, H | l+ |
| 7 | R, S, X | l+ |

The nomad may then perform the following steps instead of steps 5 and 6 above:
9. Identify the set of unique hexagons represented in the set of HexSets. E.g. H, M, N, I, O, S, T, B, G, X;
10. Select the largest integer value $t \leq 6$ such that there are at least 2 hexagons with t instances of representation via HexAnchors. e.g. $t=3$;
11. For each unique hexagon that is represented at least t times, select t instances of their respective representations (for example, in the case of hexagon N, these instances are shown in Table 2 below and, in the case of Hexagon S, these instances are shown in Table 3 below);

TABLE 2

| Anchor | HexKey Set | Dist |
|---|---|---|
| 5 | N, S, T | l |
| 4 | N, O, T | l |
| 6 | M, N, S | l |

TABLE 3

| Anchor | HexKey Set | Dist |
|---|---|---|
| 5 | N, S, T | l |
| 6 | M, N, S | l |
| 7 | R, S, X | l+ |

12. For each hexagon that is represented by at least t anchors, the nomad/device then calculates the average distance between the set of corresponding HexAnchors and the nomad. For example, the average for S would be $$\frac{l+l+l^+}{3}$$

and the average for N would be $$\frac{l+l+l}{3};$$

and

13. The hexagon with the lowest average distance is then selected as the nearest hexagon. In this example, the nomad decides it is in hexagon N. The nomad then continues with step 7 above.

In this section we consider examples of where a nomad may be and what decision would be made on their position.
Scenario 1.

For scenario 1 consider the case of FIG. 11 where a nomad who is more or less in the centre of a hexagon. The closest anchors are those that define the hexagon the nomad is in. Each anchor will be approximately a distance l away. Therefore, if at least $\tau$ anchors respond to the request for location, then the shared HexKey of these $\tau$ anchors will end up being the decided-upon nomad location.

Consider anchors 1, 2, 3, 4, 5, and 6 respond to the nomad's request to establish location. Of these, the first $\tau=5$ anchors in the ordered list shown that share a common HexKey are anchors 1, 2, 3, 4, and 5. This common HexKey is N, and the same set of anchors will subsequently collaborate, upon being asked to do so by the nomad, to produce a digital signature for the public key N.
Scenario 2.

For scenario 2 consider the case of FIG. 12 where a nomad is inside a hexagon T and the possibility of the nomad being able to produce a digital signature for another hexagon N. The following question could be asked: "what is the likelihood of a nomad (intentionally or otherwise) producing a digital signature for a hexagon where the nomad is not located)?"

That is, would a nomad in hexagon T be able to produce a signature for adjacent hexagon N? FIG. 12 shows seven lettered regions labelled a to g. Given that the area covered by the circles represent the range for which an anchor (of hexagon N) is allowed to contribute to a signature for a nomad, the lettered regions of hexagon T represent the areas where these ranges overlap. For example, region a represents the area covered by anchors 3 and 4, region b is covered by anchors 3, 4, and 5, while region g is covered by all anchors 1 to 6. The number of ranges that overlap are thus the number of HexAnchors available to contribute to the digital signature.

Note that the geometry of each of these lettered regions (shape and proportional area of the overall hexagon) would be the same for any other pair of adjacent (N and T) hexagons.

Table 4 below shows the HexAnchor overlaps for the lettered-regions in the example where the threshold value $\tau=5$.

TABLE 4

| Lettered region of Hexagon T | Overlapping anchors | Able to produce signature for hexagon N if $\tau = 5$? |
|---|---|---|
| a | $\psi_3^N, \psi_4^N$ | No |
| b | $\psi_3^N, \psi_4^N, \psi_5^N$ | No |
| c | $\psi_2^N, \psi_3^N, \psi_4^N$ | No |
| d | $\psi_2^N, \psi_3^N, \psi_4^N, \psi_5^N$ | No |
| e | $\psi_2^N, \psi_3^N, \psi_4^N, \psi_5^N, \psi_6^N$ | Yes |
| f | $\psi_1^N, \psi_2^N, \psi_3^N, \psi_4^N, \psi_5^N$ | Yes |
| g | $\psi_1^N, \psi_2^N, \psi_3^N, \psi_4^N, \psi_5^N, \psi_6^N$ | Yes |

Digital signatures can be produced for hexagon N if the nomad is within certain locations of hexagon T.

If the threshold value $\tau$ is set to 5 anchors, then the regions in hexagon T that may produce a signature for hexagon N are the lettered regions e, g, and f and these regions are close to the border of hexagon N. This 'buffer zone' may be acceptable depending on the context and circumstances for knowing the nomad's location.

Note that this ability to produce a signature despite not being within the hexagon is a concern for malicious nomads, who would be able to claim they are at a location where they are not by using the contributions of these $\tau$ anchors in overlap to produce the signature.

An honest nomad in hexagon T is able to establish their correct location in terms of their hexagon, given that the nomad will not just be receiving responses from the anchors in hexagon N, but also receiving communications from anchors in hexagon T. Assuming all anchors are operational, then in a ranked list, the nomad will arrive at $\tau$ anchors in hexagon T before they arrive at $\tau$ anchors in hexagon N.

Consider FIG. 13 which shows the two adjacent generic hexagons (N and T). Note the assumption the surrounding hexagons (not shown) have names as shown in FIG. 12. FIG. 13 shows how a nomad in hexagon T but in the range of at least $\tau$ anchors from N is classified as being in T. If $\tau \geq 4$ this references regions e, f, and/or g, as shown in Table 4.

Note from FIG. 13 that a nomad in T is always closest to an anchor $\psi_i^T$ in hexagon T than the nomad is to a mirrored counterpart $\psi_i^N$ in hexagon N. Note also the two hexagons (N and T) share the anchors $\psi_3^N = \psi_1^T$ and $\psi_4^N = \psi_6^T$.

The anchors (with their associated HexSets) are arranged as mirrored pairs in FIG. 14. Bearing in mind that both hexagons will have two shared anchors in common, note that the nomad arrives at $\tau$ anchors who have in common the hexagon T as an element of their HexSet before they arrive at $\tau$ anchors who have in common the hexagon N. This is due to the fact that (apart from shared anchors):

- for mirrored anchors, the anchor in T will always be closer to the nomad than its corresponding anchor in N.
- no other anchor has both N and T in their individual HexSet.

Referring to FIG. 14 one notices that in the ordered list the nomad will arrive at $\tau$ anchors with hexagon T in their HexSet before they arrive at $\tau$ anchors with hexagon N. Note that in FIG. 14 the nearest/furthest label only applies intra-mirrored anchor pairs, not inter-mirrored anchor pairs. Also note that, while represented as conjoined in FIG. 14, the further anchor of the pair of anchors is not necessarily the immediate successor (as it relates to distance away) in an ordered list of all anchors.

The production of the digital (ECDSA) signature that represents an authenticated nomad location will now be explained, wherein the set of $\tau$ anchors required to produce the signature is $\pi = \{\psi_a^N, \psi_b^N, \ldots, \psi_\tau^N\}$ and that:

- the nomad has determined its location/hexagon as described above (e.g. hexagon N);
- all HexAnchors have received and validated the key shares for the hexagons (in particular hexagon N) of their respective HexSets. This keyshare validation can be done using the validations schemes described earlier; and
- the communication of the nomad to the anchor $\psi_i^N$ may include an embedded unique identifier of the nomad, such as a number that is tied to the physical mobile sim card. The inclusion of the sim card identifier information within the communication is preferably not performed by the nomad himself but by their device employing the PLaCES protocol. As an example, a user making a phone call does not input their personal telephone number, but the cell towers are able to identify that the phone call is originating from that particular phone based on information contained within the sim card. It is advantageous to the security of the PLaCES protocol that it is difficult for the nomad to change the information (such as the nomadID) that is embedded via the sim card in their communications with the HexAnchors.

Once all HexAnchors have validated all their keyshares (using for example the PVSS method described above), a process is initiated to determine which anchors are involved in the collaboration that produces the digital signature. Once this is complete, the anchors then initiate the collaborative process of producing the signature. As mentioned above, the signature is derived through the use of a threshold signature scheme.

Recall that from the ordered list of anchors, where the anchors are arranged by proximity to the nomad, the first hexagon that is common to at least $\tau$ anchors is deemed the location of the nomad. These $\tau$ anchors are therefore used in the creation of the signature that confirms the nomad's location.

In this process, assuming the nomad is seeking to prove that they are in Hexagon N:

1. the nomad sends a request to each of the c anchors asking them to participate in the signature collaboration for Hexagon N. This communication to each node can be done simultaneously;
2. the communication to each anchor $\psi_i^N$ includes the hexagon public key N, and at least a hash of the message m that the nomad wants signed. Alternatively or additionally, the message itself may be sent;

3. each anchor checks the blockchain to determine if a stipulated nomadID in a transaction, which may be submitted by further user, is the same as what is included in the nomad's communication and/or is the same as the nomadID in the message m;
4. each anchor $\psi_i^N$ of the $\tau$ anchors, on receipt of the request, may perform a check to confirm that the nomad is within a required range;
5. if the nomad is within range and the nomadIDs match, the anchor $\psi_i^N$ creates (and may save in their internal storage) a vector $\bar{v}_i^N$ that contains the following data: $<P_i$, sig, N, H(m), timestamp, distance, nomadID$>$, where:
   a. $P_i$ is the public key of anchor $\psi_i^N$, (a personal key, different to a HexKey);
   b. H(m) the hash of the message or transaction that needs to be signed;
   c. distance is the distance of the nomad away from the anchor;
   d. timestamp is the time at which $\psi_i^N$ confirmed the nomad's distance; and
   e. sig is a digital signature, based on the public key $P_i$, of the hash of 'the concatenation of at least if (m), N, timestamp, distance, and nomadID';
6. each anchor $\psi_i^N$ sends their vector $\bar{v}_i^N$ to the nomad;
7. the nomad adds each of these vectors to a list LV; and
8. if the list contains vectors with valid sigs from at least $\tau$ anchors, then these anchors are chosen to collaborate in producing the digital signature corresponding to the location.

Including the nomadID as a value in the message that is to be signed is advantageous in that, where the message is a bitcoin transaction, the nomadID is stored within the bitcoin transaction by way of the opcode OP_RETURN and is immutably and publicly stored on the blockchain.

Where privacy of the nomad's message is desired, the nomad may opt to only send the hash of its message to the anchors. However, the signature that the anchors collaborate to produce will be a signature of the hash of the hash of the message combined with the nomadID, i.e. H(H(m),nomadID).

The reason for the inclusion of the identifier in message m is that the HexAnchors can then check that the intended physical device from which the nomad is communicating corresponds to the stipulated identifier on the blockchain.

Note that the stipulation of the identifier may be done in the transaction of the further user (the further user being a user who requires that the recipient be at a particular location in order to redeem the submitted transaction). The stipulated identifier could be stored in the OP_RETURN or otherwise of that further user's transaction.

The blockchain provides a record of the transaction and of the stipulated identifier/nomadID that is public and immutable. HexAnchors may check the blockchain to ascertain what the stipulated nomadID is when asked to collaborate to sign a message/transaction, or at any arbitrarily chosen time.

Now that the set of 7 HexAnchors have agreed to participate in the signature collaboration for hexagon N, the anchors can then produce said signature. This collaborative signature process, as previously stated, uses the Threshold Signature Scheme described earlier and is described in detail below.

An ECDSA signature is the pair (r, s) where $r = x_1 \mod n$ where $(x_1, y_1) = k \times G$ $s = k^{-1}(m+xr) \mod n$ and x is the private key.

The process for generating the ECDSA signature is laid out below.

TABLE 5

Steps in Signature Generation

| Step | Activity |
| --- | --- |
| Step 1 | The group $\pi$ of $\tau = 2t + 1$ anchors uses dealerless secret distribution to calculate a share $k_i$ which is a random number. |
| Step 2 | A subgroup $\pi'$ of $t + 1$ anchors collaborate to produce $k \times G = (x_1, y_1)$ using Secure Share Joining. The value $r = x_1 \mod n$ is broadcast to the whole group $\pi$. |
| Step 3 | The group $\pi$ of $2t + 1$ uses Secure Inverse to calculate shares in $k^{-1} \mod n$. We will refer to each share as $k_i^{-1}$. |
| Step 4 | Each anchor $\psi_i^N$ of the group $\pi$ calculates a part $b_{i,x} k_i^{-1} (m + x_i r) \mod n$, where m is the message (e.g. the cryptographic transaction) being signed. |
| Step 5 | The group $\pi$ collaborates to add their parts of Step 4, giving s of the requested ECDSA signature. |

Optionally, in the production of the signature, HexAnchors do not interface directly with other anchors but instead communicate through the nomad. The advantage of this is that the anchors, in their individual communications with the nomad, are provided with more opportunities to confirm that the nomad is within the required range of the anchors. If at any point the nomad is not within the required range of a particular HexAnchor, that HexAnchor can abort the signing process by no longer collaborating to generate the signature. Each anchor does not necessarily have to perform this distance-check at every opportunity, given efficiency and other concerns. Each anchor has the ability to choose when to check the distance as it sees fit.

Each Step of Table 5 is now described in terms of how the nomad may be included in the performance of those steps.

Step 1: The group $\pi$ of $\tau=2t+1$ anchors uses dealerless secret distribution to calculate a share $k_i$ which is a random number. Process illustrated in FIG. 16.

Step 1 is the distribution of shares of an ephemeral key k, which is a randomly generated number that will be used in the calculation of the ECDSA signature. An ECDSA signature is the pair (r, s) where k is such that $0<k<q$ and q is the order of the subgroup, $r=x_1 \mod n$ of $k \times G=(x_1, y_1)$ and $s=k^{-1}(m+xr) \mod n$.

Based on the Dealer-Less Based Keyshare Distribution described above, the following steps are carried out. Assuming the nomad is in possession of a list LV which contains at least $\tau$ vectors then:

1. The nomad sends to each HexAnchor the list LV as well as the x-value $x_i$ each anchor is assigned for the polynomial on which their share $k_i$ (of random value k) is found. In some cases it may not be necessary to send these x-values and it can just be assumed that anchor $\psi_i^N$ will utilise i as their $x_i$, as in 3 will be the x-value for anchor $\psi_3^N$. Note that $x_i$ may be regarded as a share portion of cryptographic secret k.

2. On their reception of LV, each anchor will validate the sigs in each vector, and that the 'stipulated nomadID in m' matches the 'embedded nomadID of communication' and/or matches the 'stipulated identifier in the payer's transaction found in the blockchain'.

3. The anchor $\psi_i^N$ verifies that the nomad is within required range, as follows:

a. First the anchor $\psi_i^N$ uses the distance and timestamp values of at least three random vectors from the set $\{\overline{v}_j^N: j \neq i\}$ in LV to perform a trilateration calculation. This gives the anchor $\psi_i^N$ a more precise understanding of where in the hexagon N the nomad is likely to be.

b. Secondly, if desired, the anchor may perform a function to once again calculate its distance from the nomad. Reasons for doing so may include inconsistencies from trilateration calculations using vector data, or from the time-elapsed since last communication with anchor.

4. If the anchor is not satisfied that the nomad is within the required region, the anchor will exit the signature generation process, otherwise the anchor continues to the next steps.
5. The anchor $\psi_i^N$ then generates a random polynomial $f_i(x)$ with degree t.
6. The anchor $\psi_i^N$ sends to the nomad an updated version of his vector $\overline{v}_i^N$. 'Updated' refers to the inclusion of the new distance and its corresponding timestamp obtained from the new distance verification.
7. The nomad updates LV with any new $\overline{v}_i^N$ values.
8. The anchor $\psi_i^N$ secretly sends to the nomad every other player's point (y-value) on anchor $\psi_i^N$ 's polynomial, $f_i(x_j)$mod n. These points are 'secret' in that each point is individually encrypted with the public key $P_j$: $j \neq i$ of the intended anchor. The y-values may be referred to as function values.
9. The nomad in turn transfers the points to the intended anchors
10. Each anchor $\psi_i^N$ sums all their received $f_1(x_i)$, $f_2(x_i)$, ... $f_\tau(x_i)$ to form their share $$k_i = f(x_i) \bmod n = \sum_{j \in \pi} f_j(x_i)$$

of the random value k.

Step 2: A subgroup $\pi'$ of t+1 players collaborate to produce $k \times G = (x_1, y_1)$ using Secure Share Joining. The value $r = x_1 \bmod n$ is broadcast to the whole group. Process illustrated in FIG. 17.

In step 2 the collaborating anchors produce the EC public key r=kG without revealing their individual $k_i$ shares of the random value k. Note that not all $\tau = 2t+1$ anchors are required to participate to produce kG, only $\pi' = t+1$ anchors are required to participate. The multiplication necessary to produce the public key is based on the Secure Share Joining described earlier. The following steps are carried out:

11. The nomad selects $\pi'$ HexAnchors from LV as the anchors that will participate.
12. The nomad sends a request to those anchors to participate along with current version of LV.
13. On their reception of LV, each anchor validates the sigs in each vector, and that the stipulated nomadID in m matches the embedded nomadID found in the communication.
14. Each of the $\pi'$ anchors $\psi_i^N$ verifies that the nomad is within range. This can be done using both the trilateration and distance calculations as previously described in Step 1. The anchor calculating the distance between itself and the node is optional.
15. Each anchor $\psi_i^N$ calculates their part $b_{i,\pi'} k_i \times G$ where b is an interpolating factor. These parts may be regarded as parts of the cryptographic signature.
16. Each anchor $\psi_i^N$ sends their part to the nomad as well as any updated versions of their vector $\overline{v}_i^N$.
17. The nomad sums, or combines, each part to produce:

$$(x_1, y_1) = \sum_{i \in \pi'} b_{i,\pi'} k_i \times G = kG$$

Where kG may be regarded as a component of the signature, as $r = x_1 \bmod n$ is a component of the signature (r, s) and is directly and easily derivable from kG.

18. The nomad sends at least $r = x_i \bmod n$ to all participating HexAnchors.
19. The nomad updates LV with any new $\overline{v}_i^N$ values received.

Step 3: The group $\pi$ of $\tau = 2t+1$ anchors uses Secure Inverse to calculate shares in $k^{-1} \bmod n$. Each share is referred to as as $k_i^{-1}$. Process illustrated in FIG. 18.

To calculate s In the determination of the ECDSA signature the inverse of k is required. However, the value $k^{-1}$ (or k) is not known by any participant. Instead, each HexAnchor calculates and utilises their share $k_i^{-1}$ in the creation of a part of the signature. As this process includes the multiplication of secret shares, the group $\pi$ comprises $\pi = 2t+1$ players collaborating to calculate a share in $k^{-1} \bmod n$.

To get their share in the inverse the following steps are carried out:

20. Nomad initiates the process sending LV and the request to produce the $k_i^{-1}$ shares.
21. On their reception of LV, each anchor validates the sigs in each vector, and that the stipulated nomadID in m matches the embedded nomadID found in the communication.
22. Each of the $\pi$ anchors $\psi_i^N$ verifies that the nomad is within range. The same 2-stage distance check as in Step 1 and Step 2 may be used to perform this verification.
23. The anchors and nomad utilise the dealerless secret distribution to calculate a share $c_i$ which is a random number. This is accomplished the same way as that of the method of Step 1.
24. Each anchor $\psi_i^N$ calculates a part $b_{i,\pi} k_i c_i \bmod n$ and sends this to the nomad.
25. The nomad sums each part to produce $$\sum_{i \in \pi} b_{i,\pi} k_i c_i \bmod n = kc$$

kc may be regarded as an intermediate cryptographic value as it is not a component of the signature, but it is used in the process of securely calculating a component of the signature. Parts $b_{i,\pi} k_i c_i \bmod n$ can therefore be referred to as parts of an intermediate cryptographic value.

26. The nomad sends the value kc to each anchor.
27. Each anchor or calculates the multiplicative inverse $(kc \bmod n)^{-1} \bmod n = k^{-1} c^{-1} \bmod n$
28. Each anchor $\psi_i^N$ calculates a second part $k^{-1} c^{-1} \times c_i \bmod n$.

This is the anchor's share $k_i^{-1}$ of the inverse value $k^{-1}$.

Step 4: Each anchor $\psi_i^n$ of the group it calculates a part $b_{i,\pi} k_i^{-1} (m + x_i r) \bmod n$, where m is the message (e.g. the cryptographic transaction) being signed.

Now that each HexAnchor has their $k_i^{-1}$ share of the inverse $k^{-1}$, each anchor then calculates their part of the ECDSA signature 29. Each anchor $\psi_i^N$ calculates their part of the signature $$b_{i,\pi}k_i^{-1}(m++x_i r) \bmod n$$

30. Anchors send their part to the nomad.

Step 5: The group collaborates to add their parts giving s of the required ECDSA signature:

The nomad now has the responsibility of adding all the parts from the set of $\tau=2t\pm 1$ anchors to produce s of the ECDSA signature (r, s).

31. Nomad sums, or combines, all the parts to produce s, another component of the signature, as follows:

$$s = \sum_{i \in \pi} (b_{i,\pi} k_i^{-1}(m + x_i r) \bmod n) = k^{-1}(m + xr) \bmod n$$

32. Nomad now possesses a valid signature (r, s) confirming that the nomad's location is within a hexagon N. Recall that the nomad already knows r from Step 2.
33. Nomad may now use the digital signature for a desired service, such as that of blockchain transaction that requires confirmation of nomad location.

Note that the validation of the keyshares utilised in the production of the signature can be carried out by using the PVSS validation scheme described above. Where communication between anchors is necessary, this may be done with the nomad as the middle man.

Given that the output of a successful execution of the Proof of Location (PoL) protocol is a digital signature ECDSA, PLaCES is may be used in conjunction with Bitcoin transactions with no need to change anything (opcode or otherwise) of their respective protocols. All that is needed is the addition to the output script <scriptPubKey> of a transaction TrA the requirement for the digital signature for a Hexagon's public key (e,g. N), as part of the conditions for the input script <scriptSig> of another transaction TrB to access the coins of TrA.

While one may theoretically only require the signature for hexagon N, given that the transaction is likely to be intended for a specific individual/entity, the criteria to be satisfied for accessing the coins may be based on the Hexagon's public key as well as the entity's public key P. This may be represented in the script as an m-of-n multisig transaction, such as presented below and illustrated schematically in FIG. 19.

| <scriptPubKey> (locks output) | <scriptSig> (unlocks output) |
|---|---|
| OP_2 <pubkey N> <pubkey P> OP_2 | OP_0 <sig N> <sig P> OP_TRUE <$T_C$ redeemScript> |

When combined with the nTimeLock value of a transaction, embodiments of the disclosure may include a time criterion in addition to the location criterion. As an example, an airline may promote a scheme where they promise a discount to customers if the flight does not get the passenger where the passenger needs to be by a certain time. Such an agreement could be implemented using a commitment channel. This is a payment channel that comprises three transactions: a commitment $T_C$, payment $T_P$, and in this example a discount $T_D$ transaction.

The commitment transaction $T_C$ is created by the customer and escrows coins x that is the cost of the goods/service (airplane ticket). The escrowed funds can only be accessed upon provision of either:

1. The signatures of the customer σ(C) and the signature of the airline σ(A)
   OR
2. the location signature σ(N) AND the signature of the airline σ(A)

Note that the commitment transaction may contain a record of the nomadID (a sim card unique to the airplane).

The payment transaction $T_P$ is the transaction that the airline A uses to collect their full payment of x. Within this transaction the PLaCES signature for the intended destination hexagon of the passenger σ(N) is required together with the signature of the airline σ(A).

The HexAnchors involved in the production of σ(N) may reference the blockchain to verify that the stipulated nomadID of the commitment transaction is the same that is embedded in communications from the nomad/airplane to the anchor.

The discount transaction $T_D$ is an nTimeLocked transaction that transfers, from the x escrowed funds of the commitment transaction, a total amount of d to the customer C, and x−d to the airline. d is the amount of discount the passenger obtains.

Note that the discount transaction being nTimeLocked means that the discount transaction cannot be submitted successfully to the blockchain before a particular point in time (which may be defined in terms of UNIX time or block height). This means that if the airplane does not arrive at the location before a particular deadline, the customer may submit the discount transaction and retrieve d for themselves.

Turning now to FIG. 20, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 21, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 21 is intended only as a specific example for purposes of illustrating the preferred embodiment of the device. Many other configurations having more or fewer components than the system depicted in FIG. 21 are possible.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer implemented method, comprising the steps of:
  broadcasting, by a broadcaster, a signal containing a request for location data;
  receiving, from each of a plurality of nodes receiving said signal and determining that the broadcaster is within a predetermined distance of said node, respective location data comprising a plurality of public keys corresponding to respective areas adjacent that node, wherein the location data further comprises a distance attribute;
  ranking the public keys based on the distance attributes;
  selecting, based on said location data, a common public key which is common to a set of the plurality of nodes, wherein the step of selecting the common public key which is common to the set of the plurality of nodes is performed based on an outcome of the ranking, and wherein the distance attributes comprise a distance from respective nodes to an origin of the request and the ranking comprises ranking the public keys in order of said distances; and
  requesting the set of the plurality of nodes to participate in threshold secret sharing to obtain a cryptographic signature associated with the common public key, wherein each of said plurality of nodes has a respective plurality of private key shares, corresponding to said plurality of public keys, and said cryptographic signature is obtained from a threshold number of said private key shares.

2. The method of claim 1, wherein at least one of:
  the step of broadcasting the request for location data comprises broadcasting an identifier for identifying the broadcaster; and
  the step of receiving location data further comprises receiving, from each of the plurality of nodes, a public key associated with a respective at least one node.

3. The method of claim 1, wherein:
the step of requesting the set of the plurality of nodes to participate in threshold secret sharing to obtain a cryptographic signature associated with the common public key comprises providing data to be signed, and wherein:
the data to be signed comprises at least one of: (i) a message; (ii) a hash of the message; and (iii) an identifier for identifying the broadcaster.

4. The method of claim 1, further comprising the step of receiving from at least one node a respective node signature associated with a public key of the node, validating the node signature, and determining whether to request a node to participate in threshold secret sharing based on an outcome of said validation, and wherein the node signature is further associated with at least one of: (i) a message; (ii) a hash of the message; (iii) an identifier for identifying the broadcaster; (iv) the location data; and (v) the public key of the node.

5. The method of claim 1, further comprising at least one of the following steps: (i) sending to at least one node a share portion of a cryptographic secret; (ii) relaying from the at least one node to at least one further node a function value encrypted with a public key of the respective at least one further node; (iii) receiving from the plurality of nodes a respective plurality of parts of an intermediate cryptographic value, combining said parts into the intermediate value, and sending the intermediate value to at least one further node; (iv) receiving from the plurality of nodes a respective plurality of parts of the cryptographic signature and combining said plurality of parts into a component of the cryptographic signature; and (v) redeeming a blockchain transaction by supplying thereto the cryptographic signature.

6. A computer implemented method, comprising the steps of:
receiving, at a node, a signal from a broadcaster containing a request for location data;
determining a distance attribute associated with the request;
sending, from said node as a result of receiving said signal and determining that the broadcaster is within a predetermined distance of said node, the location data comprising the distance attribute and a plurality of public keys corresponding to respective areas adjacent that node;
receiving a request to participate in threshold secret sharing to provide a cryptographic signature associated with a common public key which is common to a set of said nodes and is selected based on said location data, wherein the location data further comprises a distance attribute and wherein the common public key which is common to the set of the plurality of nodes is selected based on an outcome of ranking the public keys based on the distance attributes, and wherein the distance attributes comprise a distance from respective nodes to an origin of the request and the ranking comprises ranking the public keys in order of said distances; and
collaborating, with a plurality of nodes, in threshold secret sharing to obtain the cryptographic signature, wherein said node has a respective plurality of private key shares, corresponding to said plurality of public keys, and said cryptographic signature is obtained from a threshold number of said private key shares of a plurality of said nodes.

7. The method according to claim 6, further comprising the step of determining a further distance attribute.

8. The method according to claim 6, wherein at least one of:
the step of determining a distance attribute comprises a time of flight measurement; and
the step of receiving the request for location data comprises receiving an identifier for identifying a broadcaster of the request for location data.

9. The method of claim 6, wherein the step of receiving the request to participate in threshold secret sharing to obtain a cryptographic signature associated with the common public key comprises receiving data to be signed, and wherein the data to be signed comprises at least one of: (i) a message; (ii) a hash of the message; and (iii) an identifier for identifying a broadcaster.

10. The method of claim 6, wherein the step of sending location data further comprises sending a node public key.

11. The method of claim 6, further comprising the step of sending to a broadcaster a node signature associated with at least a node public key, and wherein the node signature is further associated with at least one of: (i) a message; (ii) a hash of the message; (iii) an identifier for identifying the broadcaster; (iv) the location data; and (v) the node public key.

12. The method of claim 6, further comprising at least one of the following steps: (i) sending to a broadcaster of the request to participate in threshold secret sharing a share portion of a cryptographic secret; (ii) sending to the broadcaster at least one function value calculated from a respective value associated with at least one node; (iii) sending to the broadcaster a part of an intermediate cryptographic value and receiving the intermediate value; (iv) sending to the broadcaster a part of the cryptographic signature; and (v) receiving, from the broadcaster, further location data associated with a plurality of the nodes, performing a trilateration calculation to determine a calculated location of the broadcaster, comparing the calculated location to at least the location data, and determining whether to participate in the threshold secret sharing based on an outcome of said comparing.

13. A computer-implemented system comprising:
a processor; and
memory including executable instructions that, as a result of execution by the processor, cause the system to perform the steps of:
broadcasting, by a broadcaster, a request for location data, wherein the location data further comprises a distance attribute;
receiving from each of a plurality of nodes respective location data comprising at least one public key corresponding to a respective at least one area adjacent that node;
ranking the public keys based on the distance attributes;
selecting a common public key which is common to a set of the plurality of nodes; and
requesting the set of the plurality of nodes to participate in threshold secret sharing to obtain a cryptographic signature associated with the common public key, wherein the step of selecting a common public key which is common to the set of the plurality of nodes is performed based on an outcome of the ranking, and wherein the distance attributes comprise a distance from respective nodes to an origin of the request and the ranking comprises ranking the public keys in order of said distances.

14. The computer-implemented system of claim 13, wherein at least one of:

broadcasting the request for location data comprises broadcasting an identifier for identifying the broadcaster; and receiving location data further comprises receiving, from each of the plurality of nodes, a public key associated with a respective at least one node.

15. The computer-implemented system of claim 13, wherein requesting the set of the plurality of nodes to participate in threshold secret sharing to obtain a cryptographic signature associated with the common public key comprises providing data to be signed; and wherein the data to be signed comprises at least one of: (i) a message; (ii) a hash of the message; and (iii) an identifier for identifying the broadcaster.

16. The computer-implemented system of claim 13, wherein the memory includes executable instructions that, as a result of execution by the processor, cause the system to perform the steps of receiving from at least one node a respective node signature.

17. The computer-implemented system of claim 13, wherein the memory includes executable instructions that, as a result of execution by the processor, cause the system to perform at least one of the following steps: (i) sending to at least one node a share portion of a cryptographic secret; (ii) relaying from the at least one node to at least one further node a function value encrypted with a public key of the respective at least one further node; (iii) receiving from the plurality of nodes a respective plurality of parts of an intermediate cryptographic value, combining said parts into the intermediate value, and sending the intermediate value to at least one further node; (iv) receiving from the plurality of nodes a respective plurality of parts of the cryptographic signature and combining said plurality of parts into a component of the cryptographic signature; and (v) redeeming a blockchain transaction by supplying thereto the cryptographic signature.

* * * * *